US007755783B2

(12) United States Patent
Aritomi et al.

(10) Patent No.: US 7,755,783 B2
(45) Date of Patent: Jul. 13, 2010

(54) PRINTING SYSTEM CAPABLE OF CHASING A PRINTED MATERIAL

(75) Inventors: Masanori Aritomi, Shinjuku-ku (JP);
Tatsuro Uchida, Yokohama (JP);
Hiroaki Nakata, Kawasaki (JP);
Yasuhiro Kujirai, Maidenhead (GB)

(73) Assignee: Canon Kabushiki Kaisha, Tokyo (JP)

( * ) Notice: Subject to any disclaimer, the term of this patent is extended or adjusted under 35 U.S.C. 154(b) by 1235 days.

(21) Appl. No.: 11/287,537

(22) Filed: Nov. 23, 2005

(65) Prior Publication Data

US 2006/0119887 A1     Jun. 8, 2006

(30) Foreign Application Priority Data

Nov. 24, 2004   (JP)   .............................. 2004-338928

(51) Int. Cl.
*G06F 3/12* (2006.01)
(52) U.S. Cl. ..................................... 358/1.14; 358/1.15
(58) Field of Classification Search ....... 358/1.11–1.18; 709/225, 226, 228; 399/8, 79, 82, 83
See application file for complete search history.

(56) References Cited

U.S. PATENT DOCUMENTS

| 5,127,099 | A | 6/1992 | Zifferer et al. | |
| 6,202,092 | B1 * | 3/2001 | Takimoto | .................... 709/225 |
| 6,618,566 | B2 | 9/2003 | Yasuhiro | |
| 6,842,263 | B1 * | 1/2005 | Saeki | ......................... 358/1.15 |
| 2002/0131088 | A1 * | 9/2002 | Ishii | ........................... 358/402 |
| 2003/0028753 | A1 | 2/2003 | Ohishi | |
| 2004/0012816 | A1 | 1/2004 | Minowa | |
| 2005/0052677 | A1 * | 3/2005 | Maruyama | ................. 358/1.13 |
| 2005/0111045 | A1 | 5/2005 | Imai | |

FOREIGN PATENT DOCUMENTS

| CN | 1264862 A | 8/2000 |
| CN | 1446693 A | 10/2003 |
| JP | 2002-149371 A | 5/2002 |
| JP | 2003-067149 A | 3/2003 |
| JP | 2003-330638 A | 11/2003 |
| JP | 2003-330677 A | 11/2003 |
| JP | 2004-118243 A | 4/2004 |
| JP | 2004-252784 A | 9/2004 |
| JP | 2004-265175 A | 9/2004 |
| JP | 2004-302654 A | 10/2004 |
| JP | 2005-057490 A | 3/2005 |
| JP | 2005-157568 A | 6/2005 |

* cited by examiner

*Primary Examiner*—Kimberly A Williams
(74) *Attorney, Agent, or Firm*—Canon USA Inc. IP Division

(57) ABSTRACT

The present invention realizes a network printing system capable of accumulating and chasing printed data. Further, by providing a job chasing function on the printer driver side, detailed setting can be done to extract history information of the job chasing function. The detailed setting to extract history information to chase a job can be done only by a specific administrator or user so that the job can be reliably chased, whereas the administrator or user can obtain desired history information. Accordingly, a precise jog chasing system can be established.

14 Claims, 19 Drawing Sheets

PRINTING SYSTEM CAPABLE OF CHASING A PRINTED MATERIAL

BACKGROUND OF THE INVENTION

1. Field of the Invention

The present invention relates to an information processing apparatus and an information processing method. More specifically, the present invention relates to a system including an information processing apparatus such as a personal computer and a printing device such as a printer, and to devices, a method, and a control program constituting the system.

2. Description of the Related Art

Owing to a recent progress in digitalization of information and diffusion of network and mobile systems, users can access a large amount of information at one time and portability of the information has dramatically improved. This trend will inevitably accelerate.

Hitherto, various methods for preventing leakage of information have been widely used. In one of them, for example, an access right is set in confidential information or a storage server storing the information, so as to limit users who can access the confidential information.

In recent years, however, leakage of information has often been caused by a user who is permitted to access the confidential information. Therefore, leakage of information cannot be sufficiently prevented by only setting an access right.

Also, countermeasures against leakage of information have been taken in a network printing system.

An example of the countermeasures is a method of setting print permission information in a document to be printed or print data and referring to the print permission information before performing printing (e.g., see Japanese Patent Laid-Open No. 2004-252784).

Another example is a method of storing print data in a print server such that the print data can be reprinted, and storing the print data as a print log by adding a time stamp by obtaining a job name, a client name, and a user name, and by generating bitmap data based on the print data (e.g., see Japanese Patent Laid-Open No. 2002-149371).

Still another example is a method of obtaining a print log also on the printer side and storing the print log in a server (e.g., see Japanese Patent Laid-Open No. 2003-330677).

Yet another example is a method in which a spooler in a print server transmits intermediate data to be printed to a printer driver and to a database of a print log, or in which the printer driver receives the intermediate data to be printed from the spooler and transmits a PDL (page description language) to a printer and also transmits the intermediate data to the database for a print log (e.g., see Japanese Patent Laid-Open No. 2004-118243).

However, in these known arts, detailed settings or management of a print log cannot be done in an information processing apparatus provided with a printer driver.

SUMMARY OF THE INVENTION

The present invention is directed to realizing a network printing system capable of storing and chasing printed data. Further, by providing a job chasing function on the printer driver side, detailed setting can be done to extract history information of the job chasing function. The detailed setting to extract history information to chase a job can be done only by a specific administrator or user so that the job can be reliably chased, whereas the administrator or user can obtain desired history information. Accordingly, a precise jog chasing system can be established.

According to a first aspect of the present invention, an information processing apparatus includes an image processing unit for performing image processing including generating print data; an extracting unit for extracting, from the print data generated by the image processing unit, history information with which the content of the print data can be identified; an input unit for inputting control information to control the extracting unit; and a determining unit for determining whether a user has a right to input the control information to the input unit by using identification information associated with the user. If the determining unit determines that the user has a right to input the control information, the input unit permits input of the control information.

According to a second aspect of the present invention, an information processing method includes an image processing step of performing image processing including generating print data; an extracting step of extracting, from the print data generated in the image processing step, history information with which the content of the print data can be identified; an input step of inputting control information to control the extracting step; and a determining step of determining whether a user has a right to input the control information in the input step by using identification information associated with the user. If the determining step determines that the user has a right to input the control information, the input step permits input of the control information.

According to a third aspect of the present invention, a printing system includes an image processing unit configured to perform image processing including generating print data; an extracting unit configured to extract, from the print data generated by the image processing unit, history information with which the content of the print data can be identified; an input unit configured to input control information to control the extracting unit; and a determining unit configured to determine whether a user has a right to input the control information to the input unit by using identification information associated with the user. If the determining unit determines that the user has a right to input the control information, the input unit permits input of the control information.

According to a fourth aspect of the present invention, a method for controlling a printing system includes an image processing step of performing image processing including generating print data; an extracting step of extracting, from the print data generated in the image processing step, history information with which the content of the print data can be identified; an input step of inputting control information to control the extracting step; and a determining step of determining whether a user has a right to input the control information in the input step by using identification information associated with the user. If the determining step determines that the user has a right to input the control information, the input step permits input of the control information.

According to a fifth aspect of the present invention, a printer driver mounted on an information processing apparatus connecting to a printing device through a communication medium is provided. The printer driver includes a print data generating unit configured to generate print data; a chasing data generating unit configured to generate chasing data based on the print data; and a chasing data setting unit configured to perform setting about generation of the chasing data to the chasing data generating unit.

According to a sixth aspect of the present invention, a method for controlling a printer driver mounted on an information processing apparatus connecting to a printing device through a communication medium is provided. The method includes a print data generating step of generating print data; a chasing data generating step of generating chasing data based on the print data; and a chasing data setting step of performing setting about generation of the chasing data to the chasing data generating step.

Other features of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENT

An embodiment of the present invention will now be described in detail in accordance with the accompanying drawings.

Figure 1:
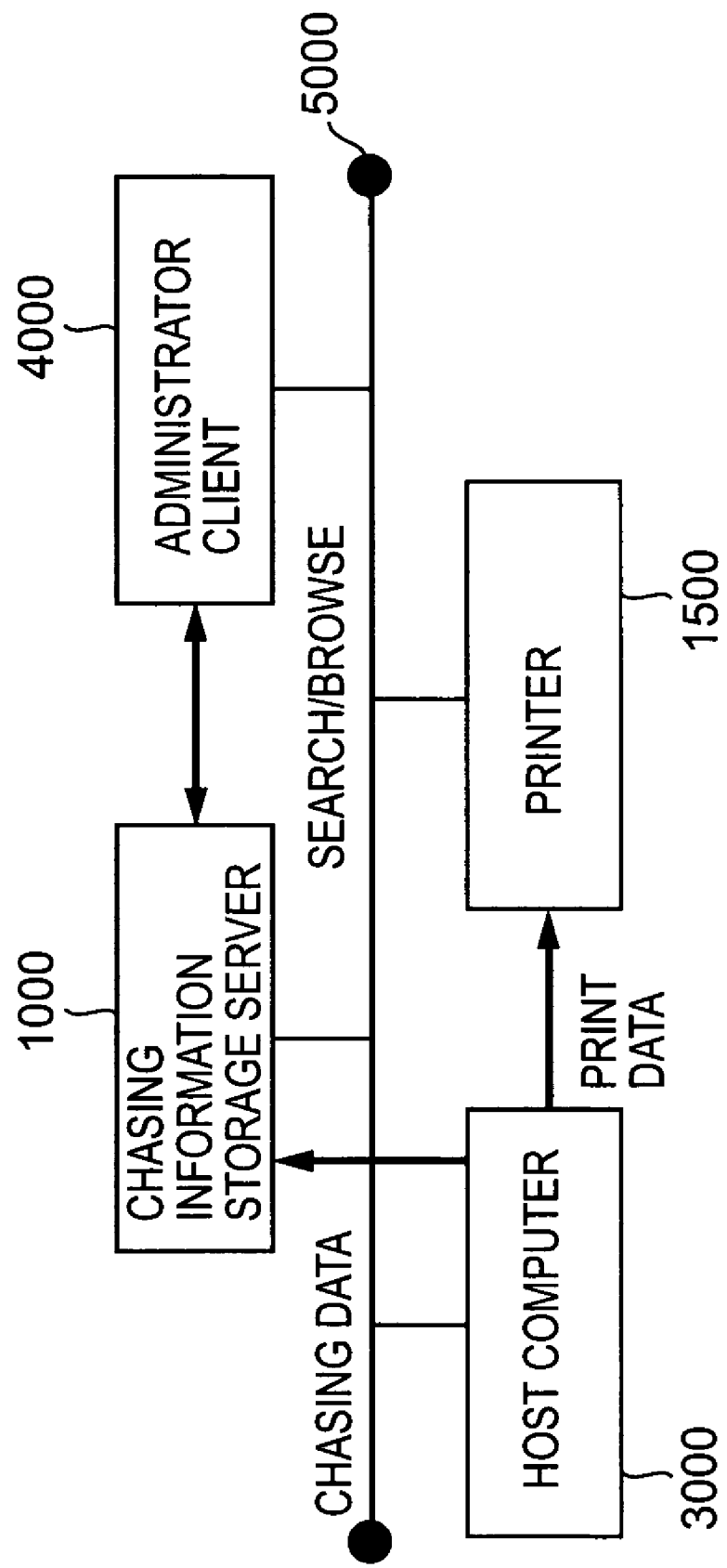
FIG. 1 is a block diagram showing the configuration of a printing system according to an embodiment of the present invention.

The configuration of a chasing system is described. FIG. 1 is a block diagram showing an example of the configuration of a printing system according to the embodiment of the present invention. The printing system includes a host computer 3000 connecting to a network 5000, a printer 1500, a chasing information storage server 1000, and an administrator client 4000.

The host computer 3000 receives a print request from a user, generates print data in accordance with the print request, and transmits the print data to the printer 1500. Also, the host computer 3000 extracts/generates chasing data that matches the print request and transmits the chasing data to the chasing information storage server 1000.

The printer 1500 performs a printing process in accordance with the received print data.

The chasing information storage server 1000 registers and stores the chasing data received from the host computer 3000 in a storage area constructed in the chasing information storage server 1000 or another information apparatus, so as to establish a database.

The administrator client 4000 is used by a system administrator to search for and browse chasing data that is registered in the database as necessary.

The administrator client 4000 can be the same information apparatus as the chasing information storage server 1000.

Figure 2:
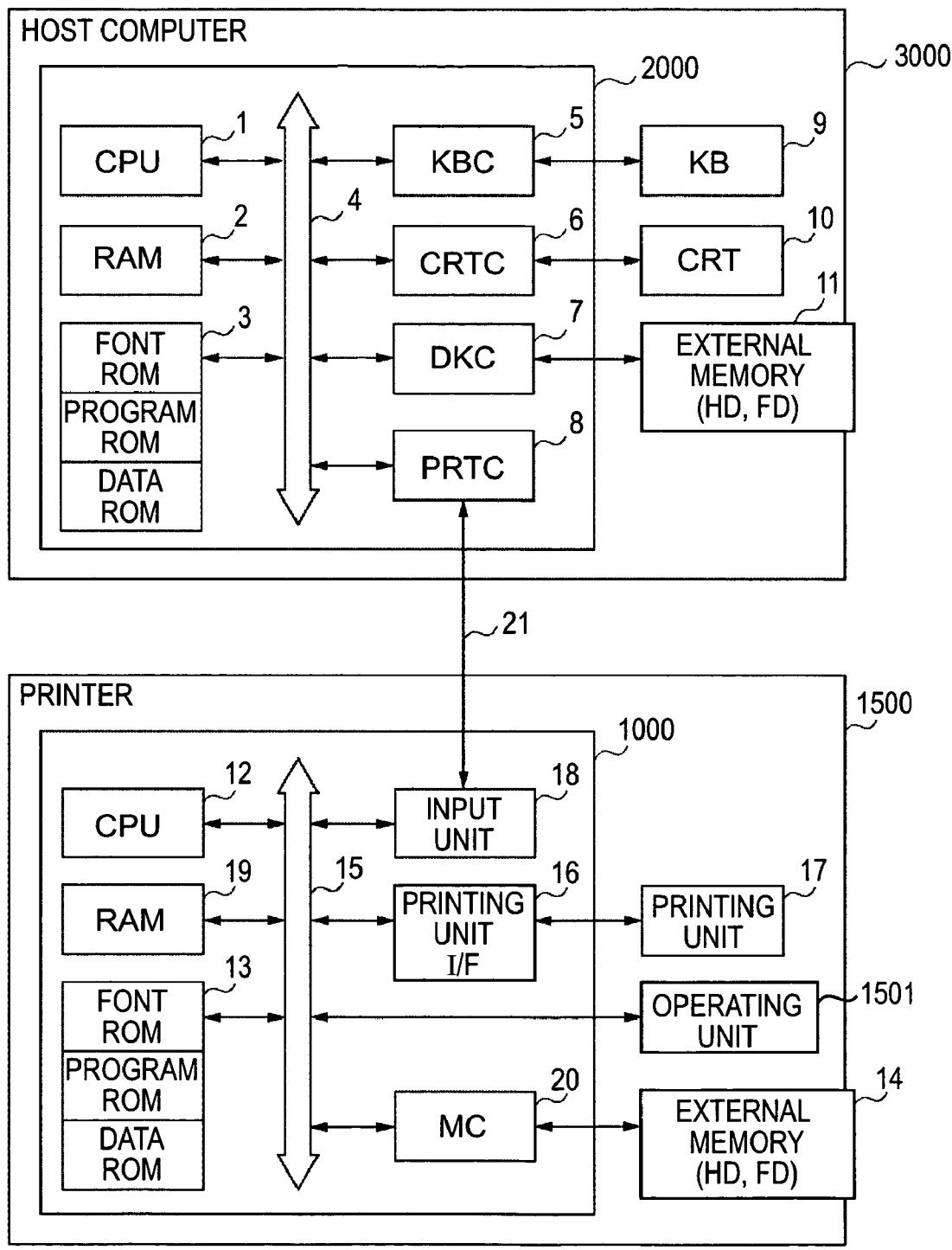
FIG. 2 is a block diagram showing the configuration of a host computer 3000 and a printer 1500 according to the embodiment of the present invention.

FIG. 2 is a block diagram showing the configuration of the host computer 3000 and the printer 1500. As long as the function of the present invention can be performed, the form of the system is not material. That is, the system can be composed of a single apparatus or a plurality of apparatuses. Further, the apparatuses can be connected through a network such as a local area network (LAN) or a wide area network (WAN) so as to execute processes.

In FIG. 2, the host computer 3000 includes a central processing unit (CPU) 1. The CPU 1 controls execution of processes (described below) according to the embodiment of the present invention, e.g., a document process of a document including figures, images, characters, and tables (including table calculation and the like) and a printing process based on the document process, in accordance with a document processing program stored in a program ROM (read only memory) in a ROM 3 or an external memory 11. The CPU 1 also controls each device connecting to a system bus 4. The program ROM in the ROM 3 or the external memory 11 stores an operating system program (OS) functioning as a control program for the CPU 1. Further, a font ROM in the ROM 3 or the external memory 11 stores font data and the like used in the above-described document process. Still further, a data ROM in the ROM 3 or the external memory 11 stores various data used in the above-described document process. A random access memory (RAM) 2 functions as a main memory or a work area of the CPU 1.

A keyboard controller (KBC) 5 controls key input from a keyboard (KB) 9 or a pointing device (not shown). A cathode ray tube controller (CRTC) 6 controls display in a CRT display (CRT) 10. A disk controller (DKC) 7 controls an access to the external memory 11, such as a hard disk (HD) or a floppy disk (FD), storing a boot program, various applications, font data, a user file, an edit file, a printer control command generating program (hereinafter referred to as a "printer driver"), and so on. A printer controller (PRTC) 8 connects to the printer 1500 through a bidirectional interface (interface) 21 and controls communication with the printer 1500.

The CPU 1 opens various windows that are registered in advance based on commands indicated by a mouse cursor (not shown) on the CRT 10, so as to execute various data processes. When a user wants to perform printing, the user opens a print setting window and sets the printer and a printing method, such as a printing mode, on the printer driver.

The printer 1500 is controlled by a CPU 12 provided therein. The printer CPU 12 outputs image signals as print output information to a printing unit (printer engine) 17 connected to a system bus 15 based on a control program stored in a ROM 13 or a control program stored in an external memory 14.

A program ROM in the ROM 13 stores a control program for the CPU 12 and so on. A font ROM in the ROM 13 stores font data and so on used to generate the above-mentioned print output information. A data ROM in the ROM 13 stores information and so on used in the computer when the printer does not have the external memory 14, such as a hard disk.

The CPU 12 can communicate with the host computer 3000 through an input unit 18, and thus information in the printer 1500 can be transmitted to the host computer 3000. A RAM 19 functions as a main memory or a work area of the CPU 12 and the memory capacity thereof can be expanded by connecting an optional RAM to an expansion port (not shown). The RAM 19 is used as an output information expanding area, an environment data storing area, a nonvolatile RAM (NVRAM), and the like.

An access to the above-described external memory 14, such as an HD or an IC card, is controlled by a memory controller (MC) 20. The external memory 14 is optionally connected and stores font data, an emulation program, form data, and so on. An operating unit 1501 includes a key switch used for an operation and a light emitting diode (LED) display device.

The printer 1500 can also include an NVRAM (not shown) to store printer mode setting information input through the operating unit 1501.

In this embodiment, the printing unit 17 functions as a printer engine using an electrophotographic method. Therefore, print data is eventually recorded on a medium such as paper by dots of toner. Of course, the printing method used in the present invention is not limited to the electrophotographic method. The present invention can be applied to printing devices using any printing method that performs printing by creating dots, e.g., an inkjet method.

Hereinafter, the configuration of a printing processing device and an information chasing device in the host computer 3000 is described with reference to FIG. 3.

Figure 3:
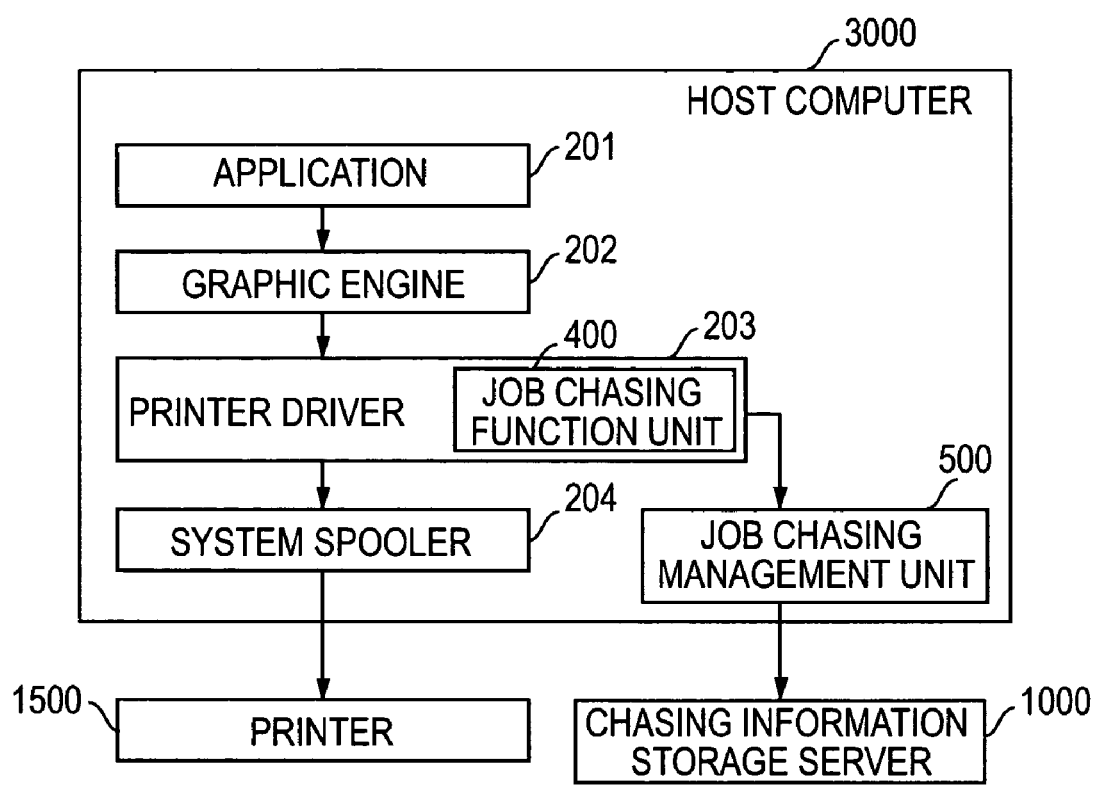
FIG. 3 shows an example of the configuration of a printing process and information chasing in the host computer 3000.

FIG. 3 shows an example of the configuration for performing a printing process and information chasing in the host computer 3000 shown in FIG. 1. In FIG. 3, an application 201, a graphic engine 202, a printer driver 203, and a system spooler 204 are stored in the external memory 11 in the form of files, each functioning as a program module that is executed after being loaded into the RAM 2 by the OS or a module using the module.

The application 201 and the printer driver 203 can be added into the HD of the external memory 11 through the FD in the external memory 11, a CD-ROM (not shown), or a network (not shown). The application 201 stored in the external memory 11 is loaded into the RAM 2 and is then executed. However, when the application 201 requests a printing process to the printer 1500, print data is output (rendered) by using the graphic engine 202 that has also been loaded into the RAM 2 and can be executed.

The graphic engine 202 loads the printer driver 203, which is provided for each printing device such as a printer, from the external memory 11 to the RAM 2, and sets an output from the application 201 to the printer driver 203. Also, the graphic engine 202 converts a graphic device interface (GDI) function received from the application 201 to a device driver interface (DDI) function and outputs the DDI function to the printer driver 203. The printer driver 203 converts the output from the application 201 into a control command that can be recognized by the printer 1500, e.g., into a page description language (PDL), based on the DDI function received from the graphic engine 202. The printer control command generated in this way is output as print data to the printer 1500 via the system spooler 204 loaded into the RAM 2 by the OS and through the interface 21.

Herein, the GDI function is rendering code data that can be interpreted on an OS (operating system) provided in the computer 3000 and is an API (application programming interface). The GDI function can be interpreted also by the application 201. The DDI function is generated by conversion by the OS in the graphic engine 202 for the printer driver. As the OS, Windows® of Microsoft Corporation or the like can be used.

Further, in the printing system according to this embodiment, a job chasing function unit 400 is provided in the printer driver 203. Either a built-in module of the printer driver 203 or a library module added by individual installation can be used as the job chasing function unit 400.

The printer driver 203 extracts/generates chasing data by executing the job chasing function unit 400 and transmits the chasing data to a job chasing management unit 500.

The job chasing management unit 500 receives the chasing data and transfers it to the chasing information storage server 1000. Incidentally, the job chasing management unit 500 can process or select the received chasing data as necessary. Further, the job chasing management unit 500 can transmit the chasing data to the chasing information storage server 1000 upon receiving the chasing data. Alternatively, the job chasing management unit 500 can temporarily store the chasing data in a storage area of the HD or the like, and then transmit the chasing data to the chasing information storage server 1000 in accordance with a specified transmission schedule.

Figure 4:
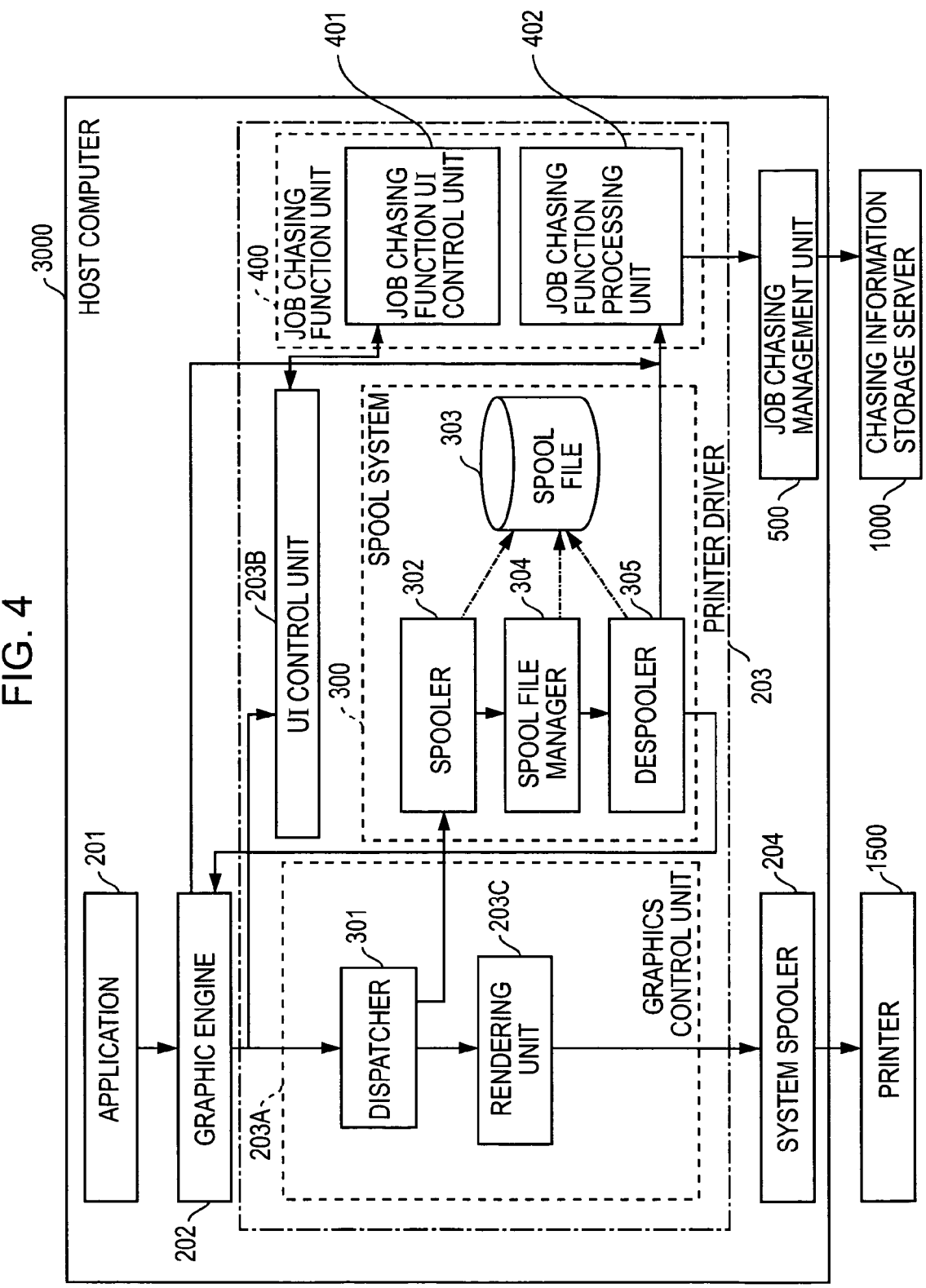
FIG. 4 shows another example of the configuration of the printing process and information chasing in the host computer 3000.

FIG. 4 shows an expanded configuration of the system shown in FIG. 3. In this configuration, when print commands are transmitted from the graphic engine 202 to the printer driver 203, a spool file 303 including intermediate code is generated by a spool system 300. In the system shown in FIG. 3, the application 201 is released from a printing process after the printer driver 203 has converted all print commands from the graphic engine 202 to printer control commands. On the other hand, in the system shown in FIG. 4, the application 201 is released from a printing process after a spooler 302 has converted all print commands into intermediate code data and output the data to the spool file 303. In a usual case, the latter takes shorter time. Further, in the system shown in FIG. 4, the content of the spool file 303 can be processed. Accordingly, the print data from the application 201 can be processed by using a function that cannot be realized by the application 201, for example, the print data can be scaled up/down or a plurality of pages can be laid out in one page by scaling them down.

For these purposes, the system shown in FIG. 3 is expanded so that print data can be spooled in the form of intermediate code data, as shown in FIG. 4. In order to process the print data, setting is done through a UI control unit 203B provided in the printer driver 203, and the setting is stored in the RAM 2 or the external memory 11.

Hereinafter, the configuration shown in FIG. 4 is described in detail. As shown in the figure, in this expanded processing system, a DDI function as a print command from the graphic engine 202 is received by a dispatcher 301. When the print command (DDI function) received by the dispatcher 301 from the graphic engine 202 is based on the print command (GDI function) that has been issued by the application 201 to the graphic engine 202, the dispatcher 301 loads the spooler 302 that is stored in the external memory 11 into the RAM 2 and transmits the print command (DDI function) to the spooler 302.

The spooler 302 analyzes the received print command (DDI function), converts the print command to intermediate code in units of pages, and outputs the intermediate code to the spool file 303. Also, the spooler 302 obtains process settings (e.g., Nup, duplex, staple, color/monochrome) about the print data from the UI control unit 203B and stores the settings in the spool file 303 in the form of a file of each job. The spool file 303 is generated in the external memory 11 in the form of a file. Alternatively, the spool file 303 can be generated in the RAM 2. Further, the spooler 302 loads a spool file manager 304 stored in the external memory 11 into the RAM 2 and notifies the spool file manager 304 of a generating state of the spool file 303. Then, the spool file manager 304 determines whether a printing process can be performed in accordance with the process settings of the print data stored in the spool file 303. The intermediate code stored in the spool file 303 is used only in the printer driver 203.

When the spool file manager 304 determines that the printing process can be performed by using the graphic engine 202, the spool file manager 304 loads a despooler 305 stored in the external memory 11 into the RAM 2 and instructs the despooler 305 to perform a process of printing a page rendering file of the intermediate code described in the spool file 303.

The despooler 305 processes the page rendering file of the intermediate code contained in the spool file 303 in accordance with a job setting file including process setting information included in the spool file 303. Specifically, the despooler 305 reads the page rendering command of the intermediate code so as to regenerate the GDI function, and outputs the GDI function through the graphic engine 202.

First, the despooler 305 ensures an area (device context) for bitmap expansion in the RAM 2 and performs rendering in order to transmit a rendering result based on the output GDI function to a job chasing function processing unit 402. The generated chasing information is converted to a format that can be read by the job chasing management unit 500 by the job chasing function processing unit 402 and is transferred thereto. The converting method used here can be a highly-compatible method, such as an XML (Extensible Markup Language) method, or can be a method according to a unique specification.

Then, the despooler 305 outputs the GDI function to the dispatcher 301 via the graphic engine 202.

When the print command (DDI function) received from the graphic engine 202 is based on the print command (GDI function) that was issued by the despooler 305 to the graphic engine 202, the dispatcher 301 transmits the print command to a rendering unit 203C, not to the spooler 302.

The rendering unit 203C generates a printer control command described in a page description language or the like based on the DDI function obtained from the graphic engine 202 and outputs the printer control command to the printer 1500 through the system spooler 204.

The configuration of the printing processing device and the information chasing device in the host computer 3000 has been described above.

Figure 6:
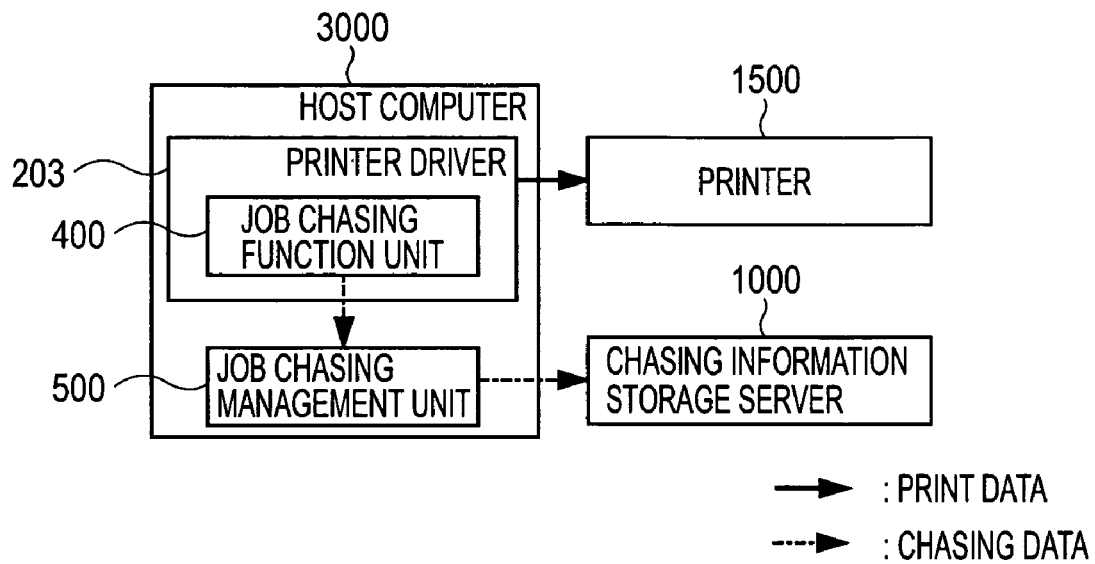
FIG. 6 shows an example of the configuration of a job chasing system according to the embodiment of the present invention.

Hereinafter, examples of the system configuration are described. Since the placement of a system setting operating unit is independent from its authority, a network printing system in which a connection path has a high degree of freedom can be provided. FIG. 6 illustrates various operation forms of this invention. At the same time, FIG. 6 shows an example of the simplest operation of this invention. That is, the job chasing management unit 500 is provided in the host computer 3000, print data is directly transmitted from the printer driver 203 to the printer 1500, and chasing data is transmitted from the job chasing function unit 400 to the chasing information storage server 1000 through the job chasing management unit 500 in the host computer 3000. This configuration is the minimum to realize the present invention. In the following description, this configuration is adopted unless otherwise specified.

Figure 7:
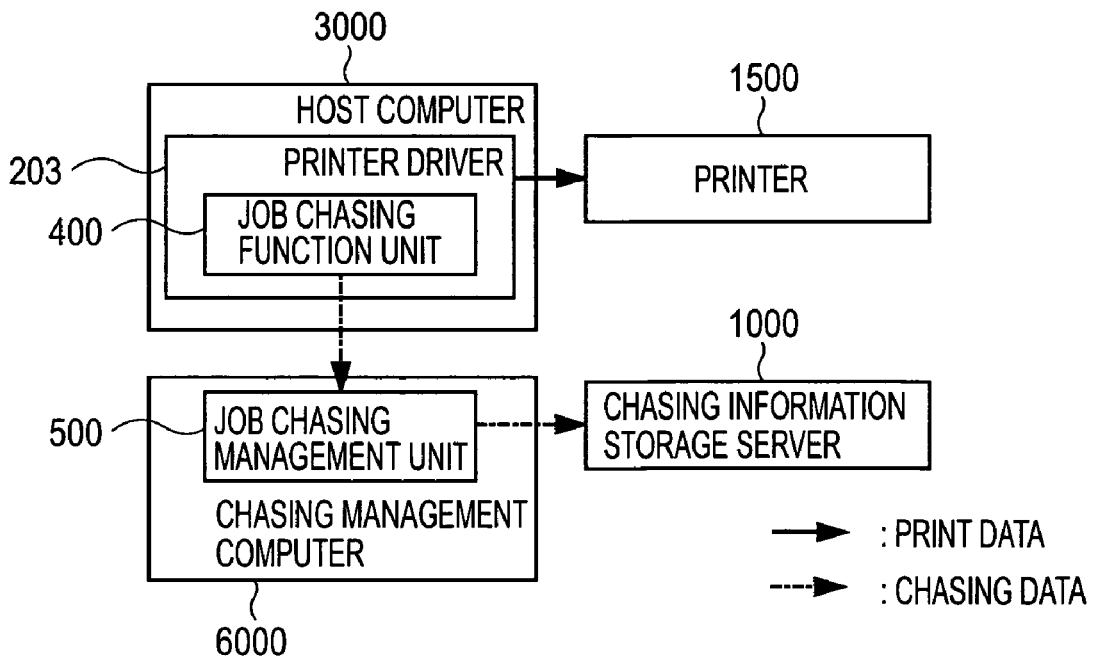
FIG. 7 shows another example of the configuration of the job chasing system according to the embodiment of the present invention.

In FIG. 7, unlike in FIG. 6, the job chasing management unit 500 is provided in a chasing management computer 6000 that is separated from the host computer 3000. In this configuration, print data is directly transmitted from the printer driver 203 to the printer 1500 as in FIG. 6, and chasing data is transmitted from the job chasing function unit 406 to the chasing information storage server 1000 through the job chasing management unit 500 in the chasing management computer 6000. With this configuration, the chasing information storage server 1000 for storing chasing data can be scheduled on a day or in a time slot when the network load becomes light, so that the load on the chasing information storage server 1000 can be controlled.

Figure 8:
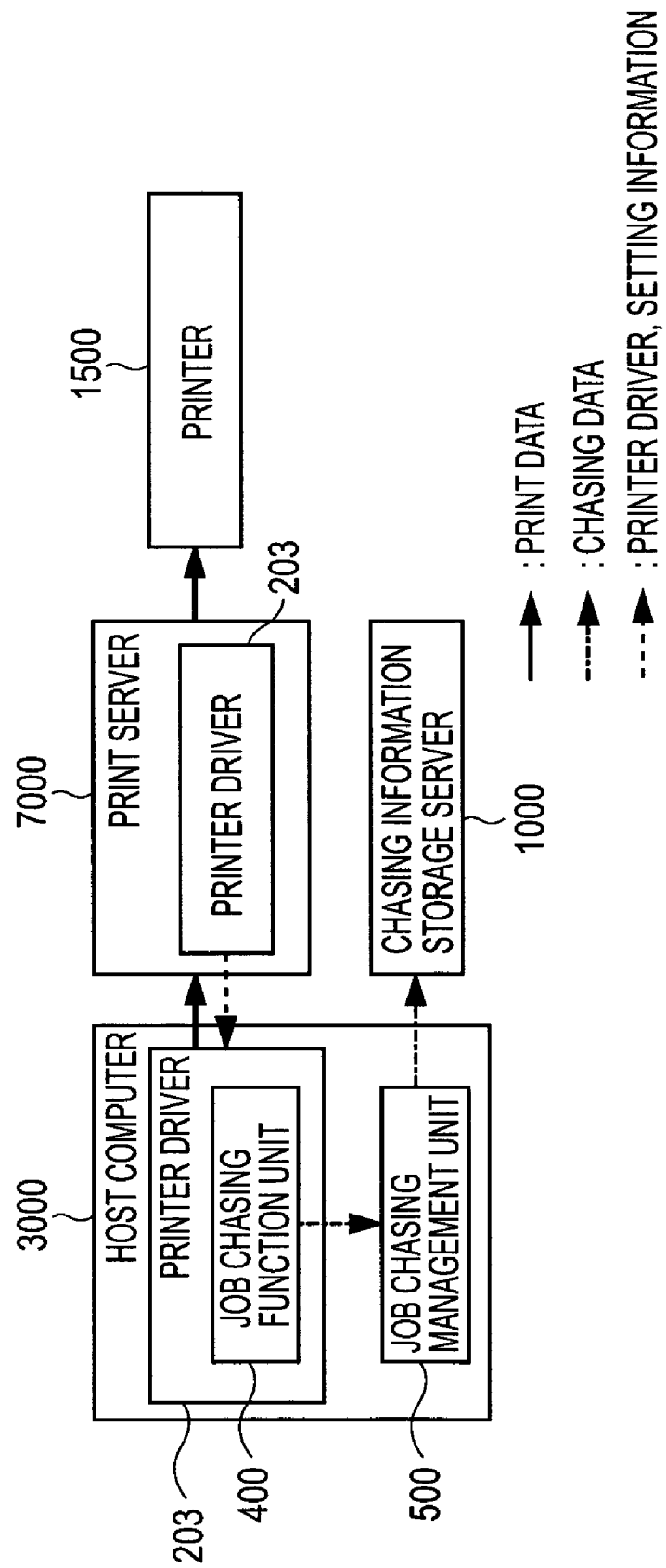
FIG. 8 shows another example of the configuration of the job chasing system according to the embodiment of the present invention.

The configuration shown in FIG. 8 is different from that in FIG. 6 in that a print server 7000 is provided between the host computer 3000 and the printer 1500. In this configuration, print data is transmitted from the printer driver 203 to the printer 1500 through a corresponding printer queue (print spooler) of the print server 7000, and chasing data is transmitted from the job chasing function unit 400 to the chasing information storage server 1000 through the job chasing management unit 500 in the host computer 3000, as in FIG. 6. With this configuration, an operation method using the print server 7000 can be realized. Further, by providing the printer driver 203 in the print server 7000, the printer driver can be distributed to the host computer 3000, synchronization can be performed, and setting information can be shared. Further, various settings relating to a job chasing function can be collectively managed in the print server 7000, so as to prevent a user who does not have a right to perform various settings of the job chasing function from changing the settings.

Figure 9:
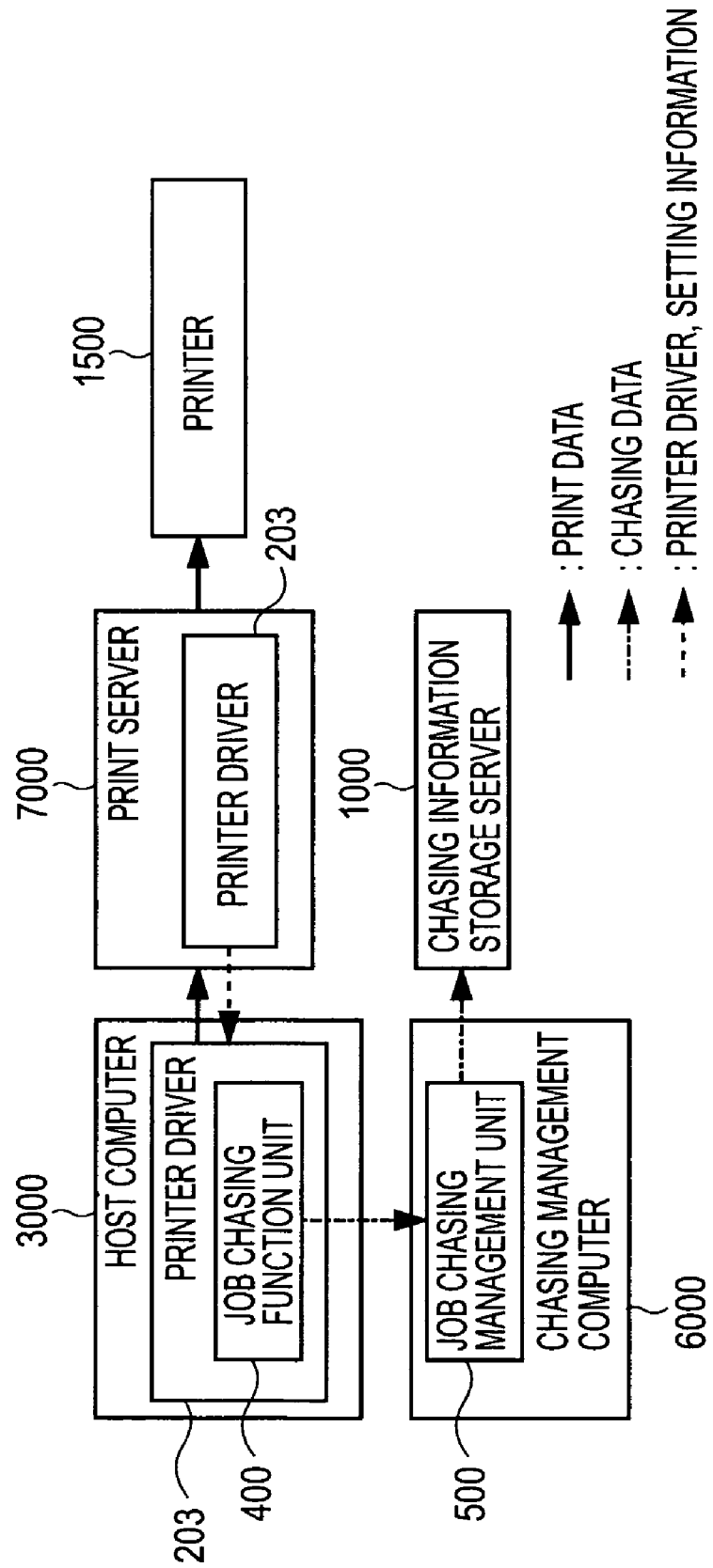
FIG. 9 shows another example of the configuration of the job chasing system according to the embodiment of the present invention.

The configuration shown in FIG. 9 is a combination of the configurations shown in FIGS. 7 and 8. That is, the print server 7000 is provided between the host computer 3000 and the printer 1500, and the job chasing management unit 500 is provided in the chasing management computer 6000 separated from the host computer 3000. In this configuration, print data is transferred from the printer driver 203 to the printer 1500 through a corresponding printer queue (print spooler) of the print server 7000, as in FIG. 8. On the other hand, chasing data is transmitted from the job chasing function unit 400 to the chasing information storage server 1000 through the job chasing management unit 500 in the chasing management computer 600, as in FIG. 7. With this configuration, advantages of the configurations shown in FIGS. 7 and 8 can be obtained at the same time.

Figure 10:
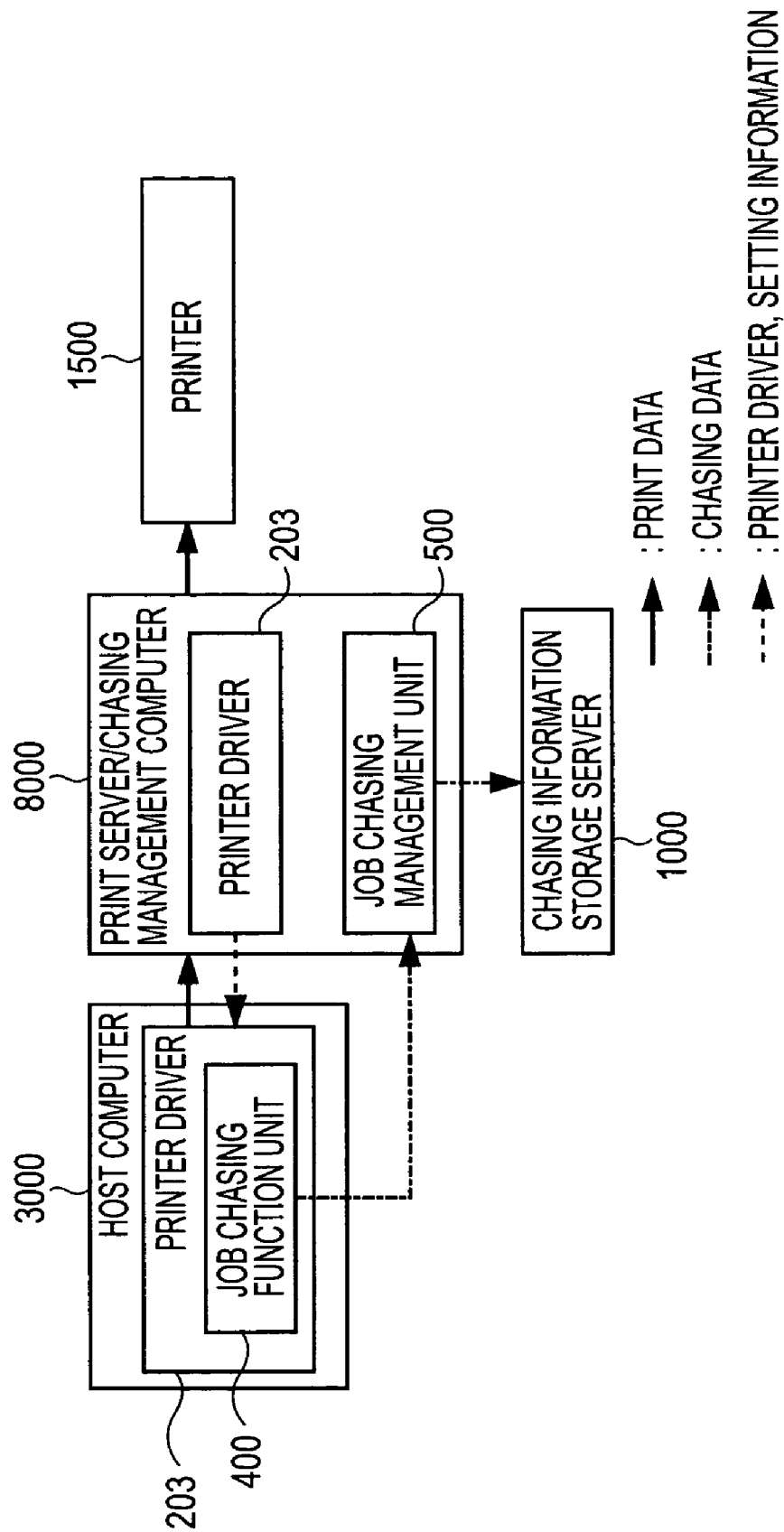
FIG. 10 shows another example of the configuration of the job chasing system according to the embodiment of the present invention.

Referring to FIG. 10, the chasing management computer 6000 and the print server 7000 shown in FIG. 9 are combined into a print server/chasing management computer 8000. In this configuration, print data is transferred from the printer driver 203 to the printer 1500 through a corresponding printer queue (print spooler) of the print server/chasing management computer 8000, and chasing data is transmitted from the job chasing function unit 400 to the chasing information storage server 1000 through the job chasing management unit 500 in the print server/chasing management computer 8000. With this configuration, the chasing management computer 6000 and the print server 7000, which are separated in FIG. 9, can be combined into the print server/chasing management computer 8000. Accordingly, the installation space and cost can be reduced.

Now, a job chasing printing process is described.

Figure 11:
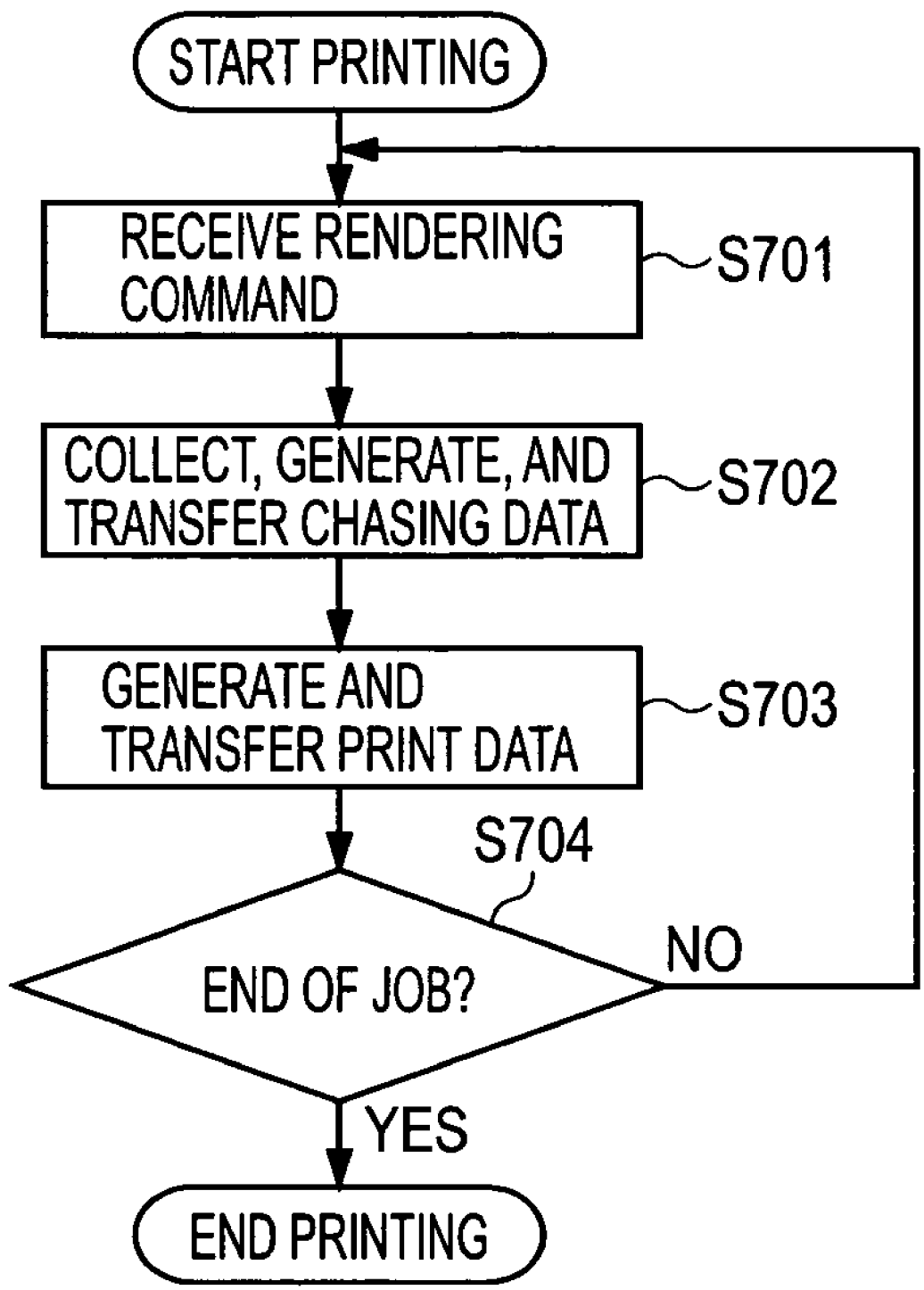
FIG. 11 is a flowchart showing an example of an overall process according to the embodiment of the present invention.

FIG. 11 is a flowchart showing the entire process of the job chasing function. The process of the job chasing function is described below by using this flowchart.

After a print job has started, the printer driver 203 receives a rendering command (DDI command) from the GDI in step S701. Then, in step S702, the printer driver 203 and the job chasing function unit 400 collect or generate chasing data corresponding to the received rendering command, and transfer the chasing data to the job chasing management unit 500.

According to the above description about FIG. 4, the GDI function is converted to the DDI function and is temporarily stored as intermediate code in the spool file 303. Then, the graphic engine 202 regenerates the GDI function based on the intermediate code and transmits the GDI function to the jog chasing management unit 500.

More specifically, chasing data is collected or generated by executing a process depending on a received rendering command or various settings set on the job chasing function unit 400 and then the chasing data is transferred to the job chasing management unit 500. For example, when the received rendering command is a print start command, attribute information about the job or information about an environment where the printing is performed is collected or generated as chasing data. When the received rendering command is a page start command, attribute information about the page is collected or generated as chasing data. Further, when the job chasing function unit 400 is instructed to extract text information, character string information is extracted from a text rendering command so as to collect or generate chasing data. When instructions to extract image information have been provided, the image information is rendered as a bitmap image in a memory area where each rendering command is ensured.

After the chasing data has been collected, generated, and transferred in the above-described manner, the process proceeds to step S703 where print data (control command that can be recognized by the printer 1500) corresponding to the rendering command received in step S701 is generated. The generated print data is written into the system spooler 204 and is then transferred to the printer 1500.

According to the above description about FIG. 4, the intermediate code that is temporarily stored in the spool file 303 is converted to a GDI function by the graphic engine 202. Then, the GDI function is transmitted to the rendering unit 203C through the dispatcher 301.

In this way, the steps of receiving a rendering command (S701), generating and transferring chasing data (S702), and generating and transferring print data (S703) are repeated until a job end command is issued (S704).

Figure 5A:
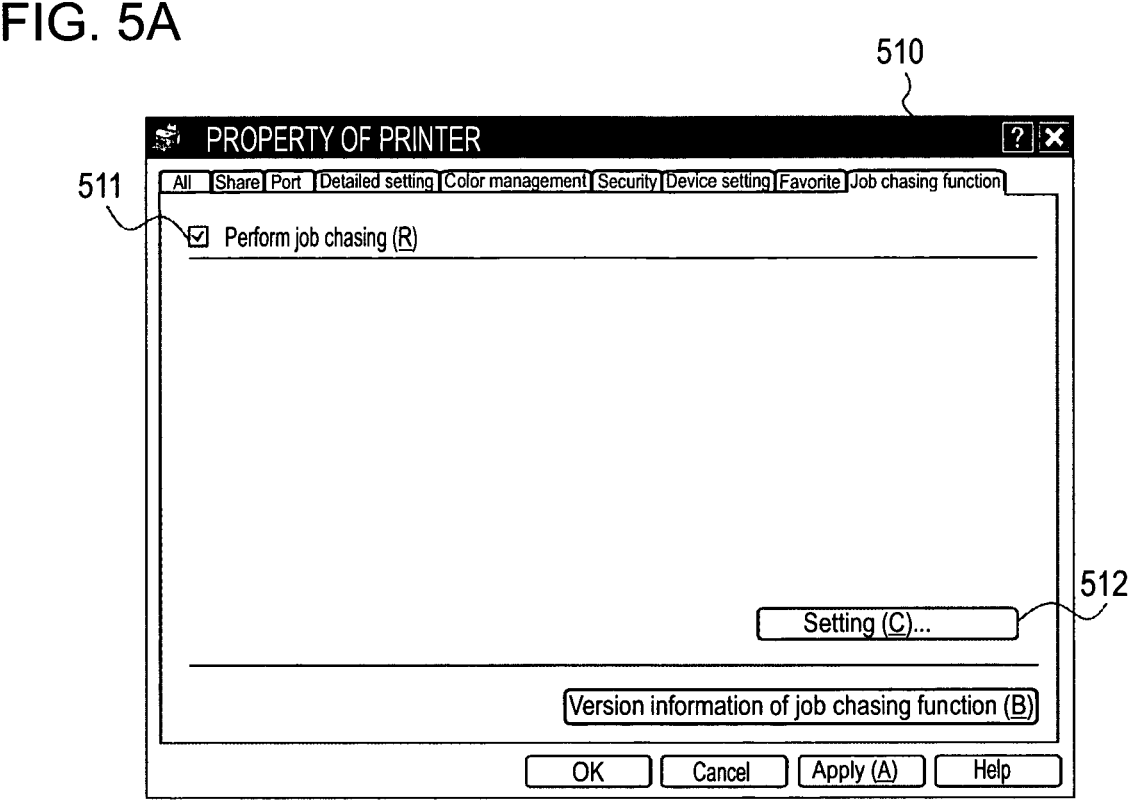
FIGS. 5A and 5B show examples of screens used to input control information of a job chasing function.
Figure 5B:
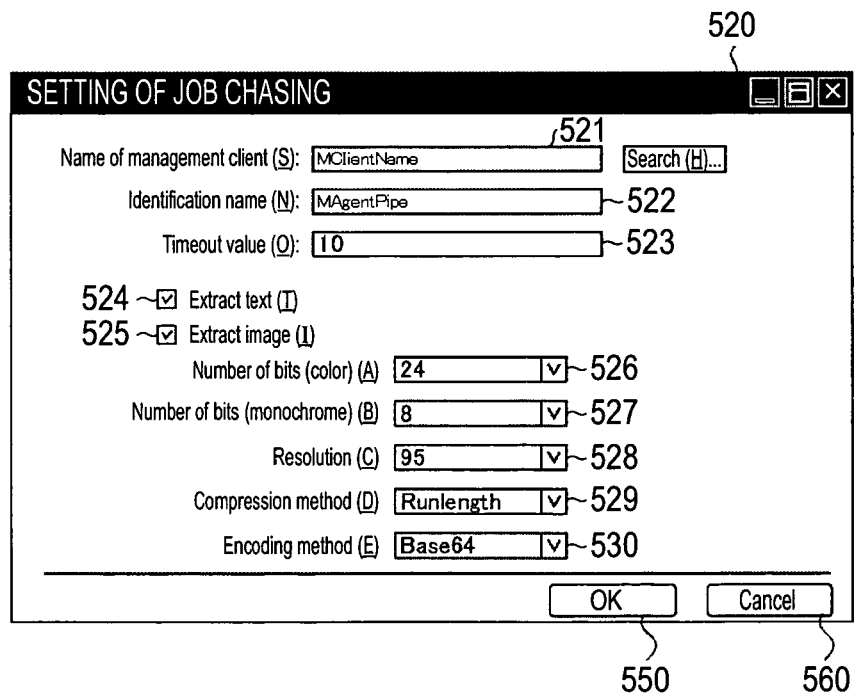
Figure 17A:
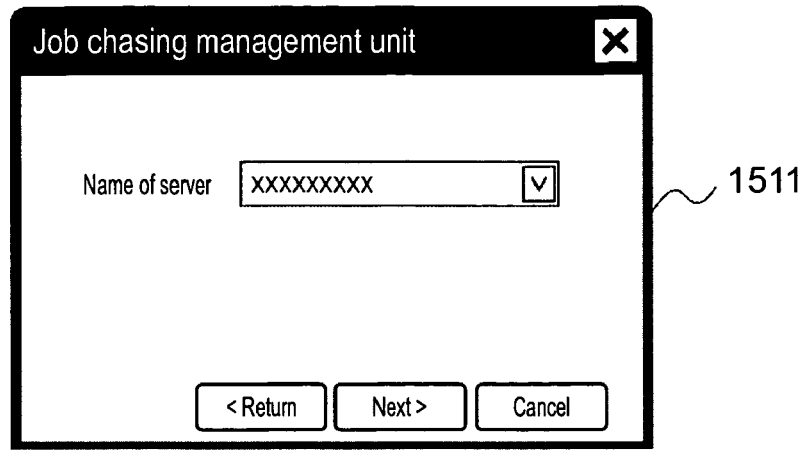
FIGS. 17A, 17B, and 17C are examples of user interfaces in the second example of right control according to the embodiment of the present invention.
Figure 17B:
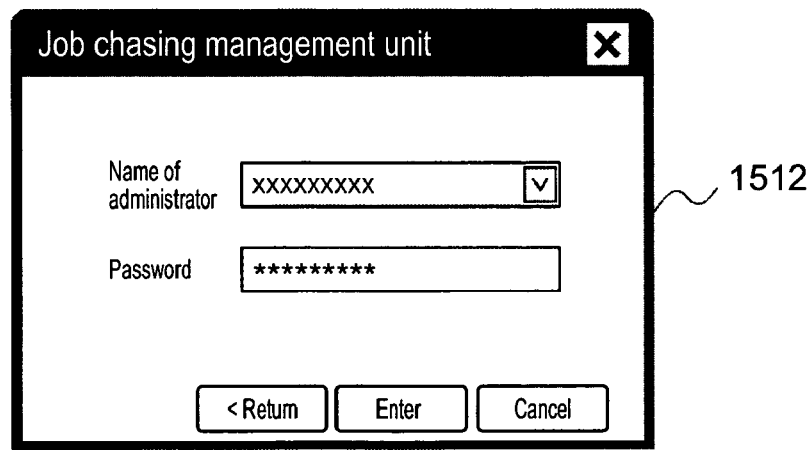
Figure 17C:
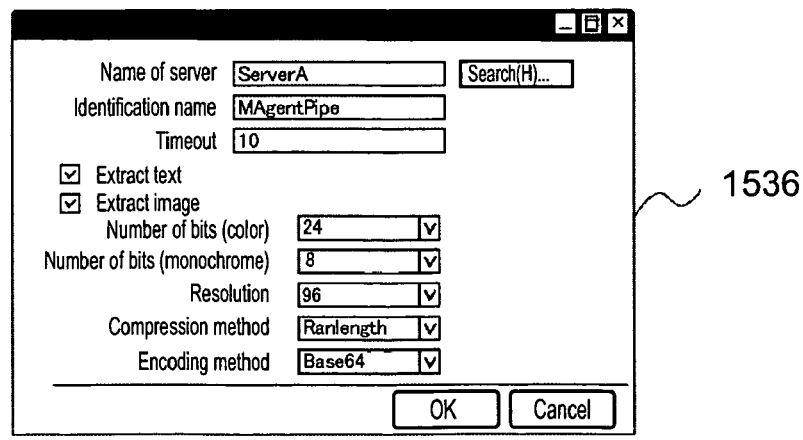

A job chasing function UI is described next. FIGS. 5A and 5B show examples of a user interface to perform settings about job chasing. FIG. 5A shows an example of an initial screen of the user interface for chasing, the screen being placed in an add-in UI control unit 401 of the printer driver 203. In this example, setting about chasing can be done in a property sheet "Job chasing function" in a dialog 510. FIG. 5B shows a screen on which an administrator performs setting through a UI 1135 of a job chasing management unit 1130 (see FIG. 13). Additionally, screens shown in FIGS. 17A, 17B, and 17C are displayed when they are called by a UI 1345 of a job chasing function unit 1340 (see FIG. 15).

Considering the operation purpose of this system, the dialog 510 should be displayed to only a user who is permitted to change the setting of a target printer. Control of displaying this dialog and limiting a user's right of execution will be described later.

Referring to FIG. 5A, a check box 511 "Perform job chasing" is used to select enable or disable of the job chasing function. The user can control ON and OFF of this function by operating this check box. When the check box 511 in FIG. 5A is clicked, a command indicating ON or OFF is input to the job chasing function UI control unit 401 shown in FIG. 4, and the job chasing function processing unit 402 is controlled according to the input command. When a command "OFF" is input, the job chasing function processing unit 402 does not start the job chasing function and keeps the job chasing function stopped.

A dialog 520 shown in FIG. 5B used for performing detailed settings of the job chasing function opens when a setting button 512 shown in FIG. 5A is selected. In this job chasing setting dialog 520, information about the destination of chasing data and the content of the chasing data generated by the job chasing function processing unit 402 are mainly set.

An identification name of a computer in which the job chasing management unit 500 operates is input to a box 521. "Name of management client" (in this embodiment, "Server A", which is the name of a computer including the job chasing management unit 500). A key for distinguishing from another connection in the job chasing management unit 500 is input to a box 522, "Identification name". Further, a timeout value used in communication with the job chasing management unit 500 is set in advance in a box 523, "Timeout value". The above three items are information used to transmit chasing data. By setting an OK button after performing the setting on this screen, the setting is stored in a setting 1131 that is managed by the job chasing management unit. The job chasing management unit controls the job chasing function unit by using the setting 1131 so as to perform a process for chasing recording of a print history and print data generated by the driver.

When the job chasing management unit 500 operates in the computer that displays this user interface, the identification name of the computer is input in the box 521 "Name of management client". When the job chasing management unit 500 operates in another computer, the identification name of the computer in which the job chasing management unit 500 operates is input to the box 521.

A check box 524 "Extract text" is used to specify whether text character string information should be included in chasing data. By checking this check box 524, the printer driver 203 extracts text character string information as chasing data by cooperating with the job chasing function unit. By adding the text character string information to the chasing data, text search can be easily performed after the chasing data has been stored in the chasing information storage server 1000.

A check box 525 "Extract image" is used to specify whether page bitmap information should be included in chasing data. By checking this check box 525, the printer driver 203 generates page bitmap information in addition to print data by cooperating with the job chasing function unit. Then, by using a file server on a network as the chasing information storage server 1000, the chasing data can be registered through a network interface. By adding the page bitmap information to the chasing data, images can be browsed after being stored in the chasing information storage server 1000.

Further, by using a box 526 "Number of bits (color)", a box 527 "Number of bits (monochrome), a box 528 "Resolution", a box 529 "Compression method", and a box 530 "Encoding method", the attribute and format of a page image to be generated can be specifically set.

Figure 12:
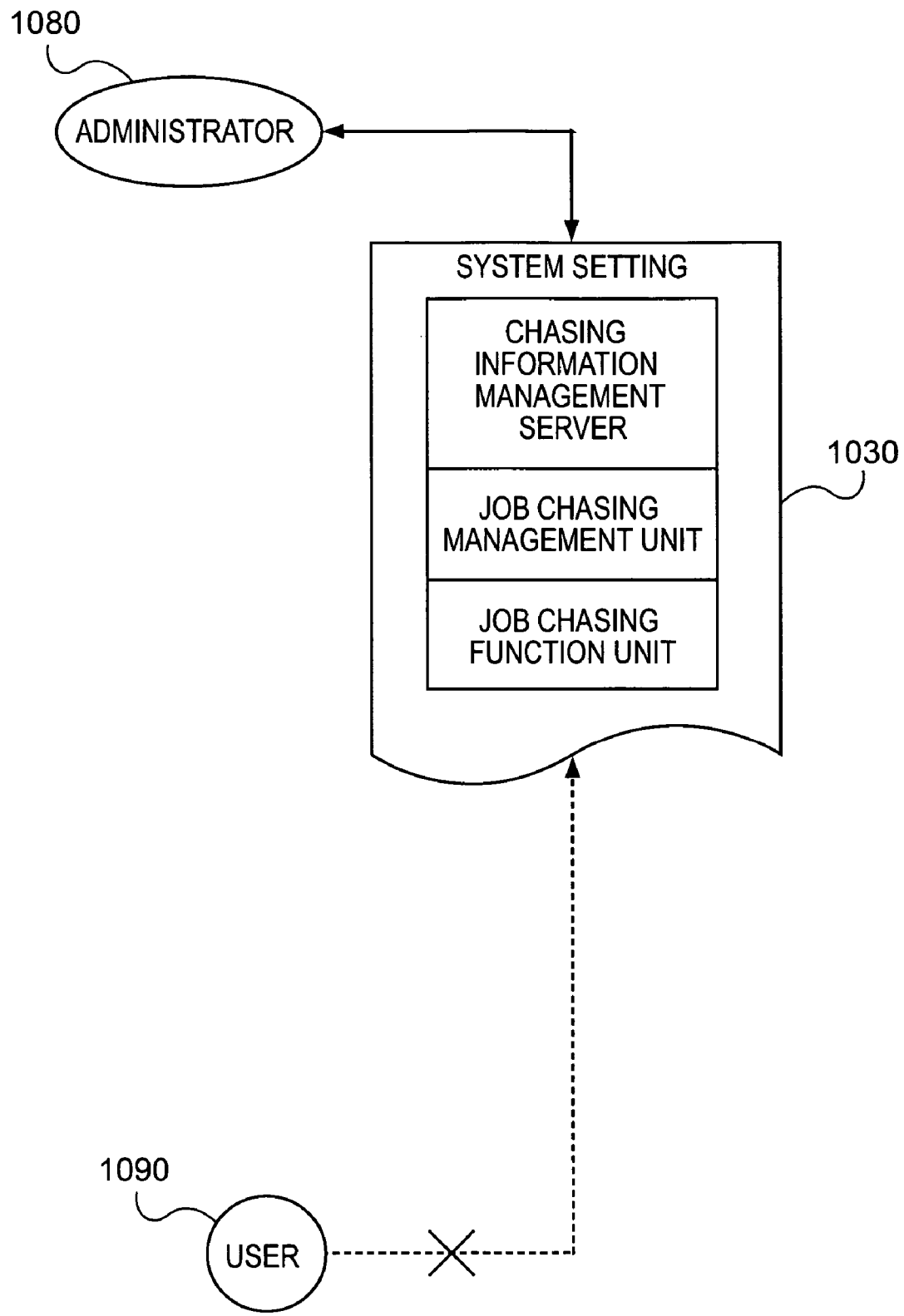
FIG. 12 shows an example of controlling a right of a setting operation according to the embodiment of the present invention.

The job chasing function UI and right control are described next. FIG. 12 is a conceptual view of controlling a right of a setting operation. Considering the operation purpose of this system, the operating unit of this network printing system should be displayed to only a user who is permitted to change settings. In a system setting 1030, an administrator 1080 can access data and its operating unit. However, a user 1090 cannot access the system setting 1030 and cannot operate the operating unit.

In order to realize this external specification, the following method is adopted. Firstly, the job chasing function unit and the job chasing management unit are separated from each other. Secondly, the job chasing function unit and the job chasing management unit can be placed in different PCs (or can be placed in the same PC). Thirdly, when a right to access the job chasing management unit is given, setting and operation can be done and a UI is displayed. Fourthly, when the access right is not given, neither setting nor operation can be done and a UI is not displayed (an unoperatable state can be indicated by graying out the job chasing UI). Fifthly, an access right control function of the OS or an authenticating function of the network printing system is used to determine the right.

Figure 13:
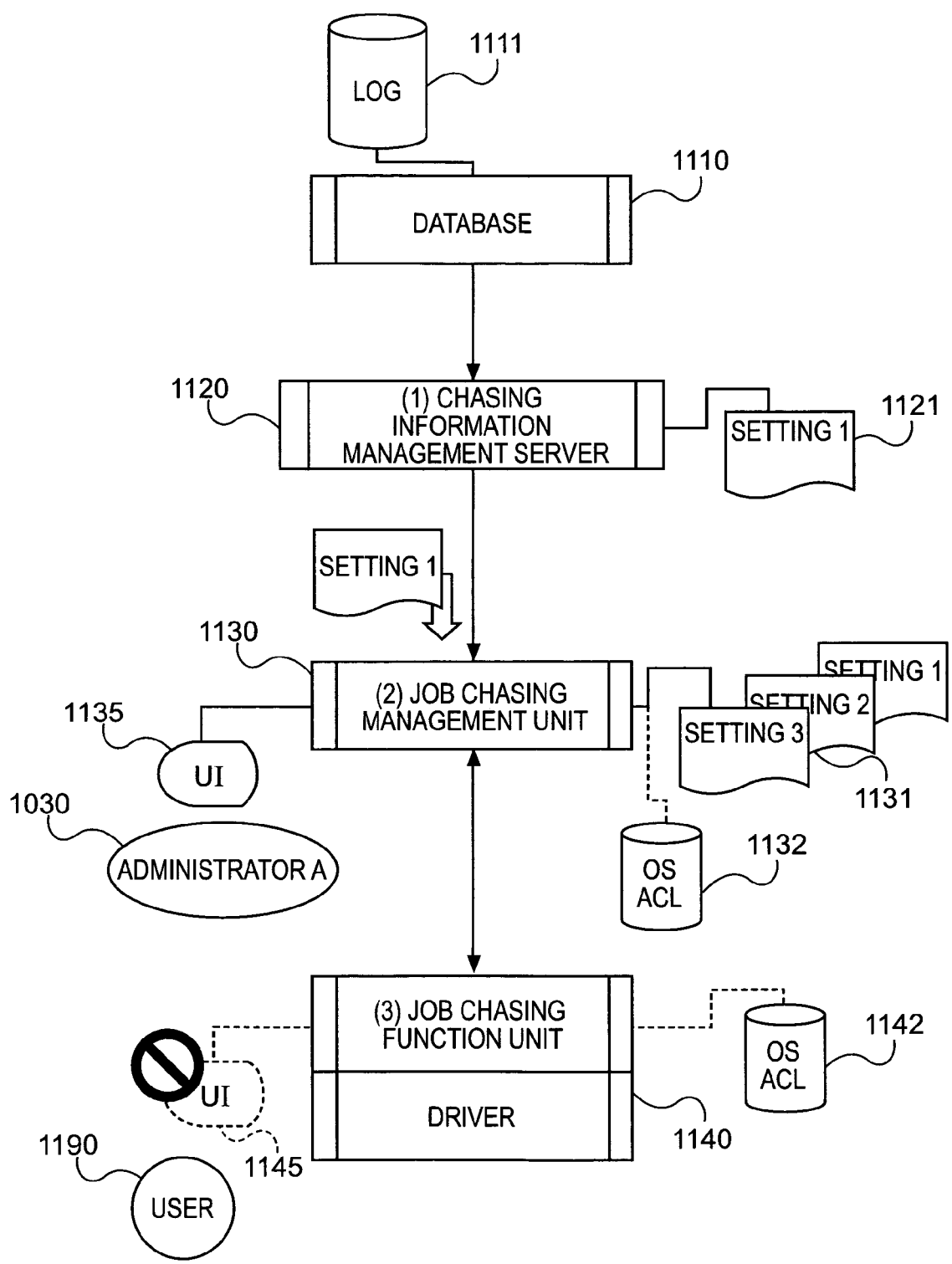
FIG. 13 shows the configuration of a first example of right control according to the embodiment of the present invention.

Hereinafter, the above-described method is described in detail. FIG. 13 shows a first example of the configuration to control the right. Herein, in an environment where each computer is managed by an existing access control list (ACL), which is a function of an OS, an administrator performs system setting so as to change the function of each client.

The ACL is a data listing of access rights of respective network users and accessible resources including servers and files. The ACL is installed in order to collectively manage devices on the network and rights to use information.

The OS determines an access right of a user to use various network resources by referring to the ACL. This function is provided in a typical OS, for example, Windows® 2000/XP of Microsoft Corporation.

In the configuration shown in FIG. 13, there is provided a storage server 1110 serving as a database for storing an extraction result 1111 of the network system, and its front end, that is, a chasing information management server 1120. Between the chasing information management server 1120 and a job chasing function unit 1140 serving as an extracting unit, the job chasing management unit 1130 having the setting 1131 and the operation UI 1135 is placed. Basically, the storage server 1110 and the management server 1120 should be mounted on different apparatuses. Also, the job chasing management unit 1130 and the job chasing function unit 1140 should be mounted on different apparatuses. However, those respective functions can be combined together so as to be mounted on a single apparatus (e.g., a PC or a work station having the same configuration as that of the host computer 3000 in FIG. 2). A setting 1121 of the chasing information management server 1120 is transmitted to the job chasing management unit 1130. This setting 1 is managed as the setting 1131 together with settings 2 and 3 of the job chasing management unit 1130 and the job chasing function unit 1140. When an administrator A 1180 wants to change the setting 1131 through the job chasing management unit 1130, the job chasing management unit 1130 refers to the ACL. When the administrator A has a setting right, the operating unit (UI) 1135 is displayed, where the administrator A can change the setting 1131. The screens shown in FIGS. 5A and 5B are displayed in the operating unit 1135, in which the user can perform settings. Then, each set value is stored as the setting 1131.

This setting 1131 includes an operation setting of the job chasing function unit and the driver 1140. The job chasing management unit 1130 operates the job chasing function unit and the driver 1140 in accordance with the setting 1131. The stored setting is as described above with reference to FIGS. 5A and 5B. Based on the stored setting 1131, the job chasing management unit 1130 controls the driver 1140 through the job chasing function unit.

When an ACL 1142 determines that a user 1190 using the client where the job chasing function unit and the driver 1140 operate does not have a setting right, the user 1190 cannot access an operating unit (UI) 1145.

Figure 14:
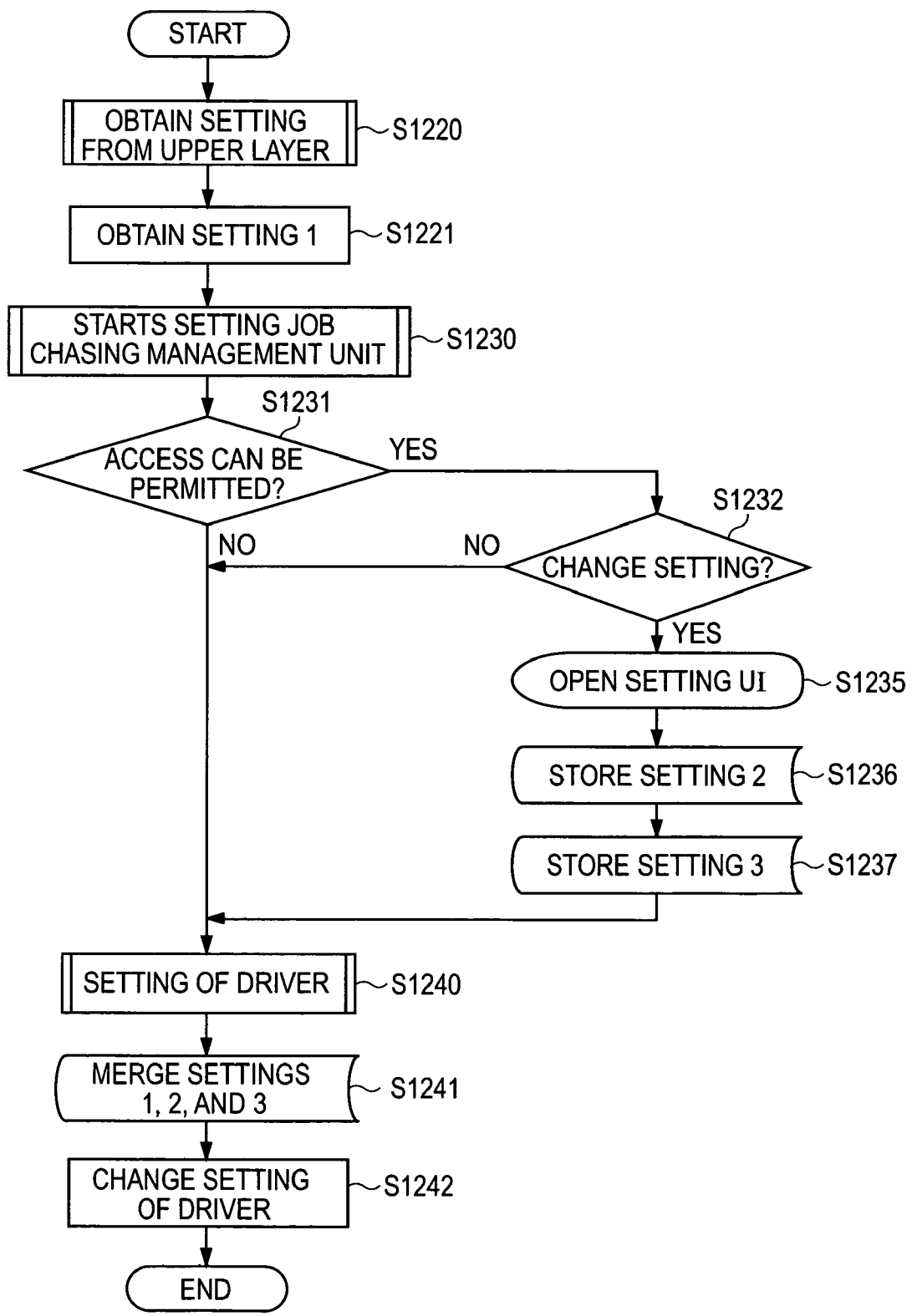
FIG. 14 is a flowchart of the first example of right control according to the embodiment of the present invention.

FIG. 14 is a flowchart of the process performed by the job chasing management unit 1130 in the first example of access control.

First, the job chasing management unit 1130 starts to obtain setting from an upper layer in step S1220. The job chasing management unit 1130 obtains the setting 1 in step S1221.

Then, the job chasing management unit 1130 starts a setting operation in step S1230. Specifically, in step S1231, the job chasing management unit 1130 checks the ACL (access control list: access right) of a user who changes the setting. If the user has an access right, the process proceeds to step S1232 where the job chasing management unit 1130 determines whether the setting should be changed. When the setting should be changed, the process proceeds to step S1235 where the setting UI is opened. Then, the setting is changed in step S1236 and the changed setting is stored in step S1237.

After that, change in setting of the driver is started in step S1240. The setting items required to the driver are merged in step S1241, and the setting of the driver is changed in step S1242.

Figure 15:
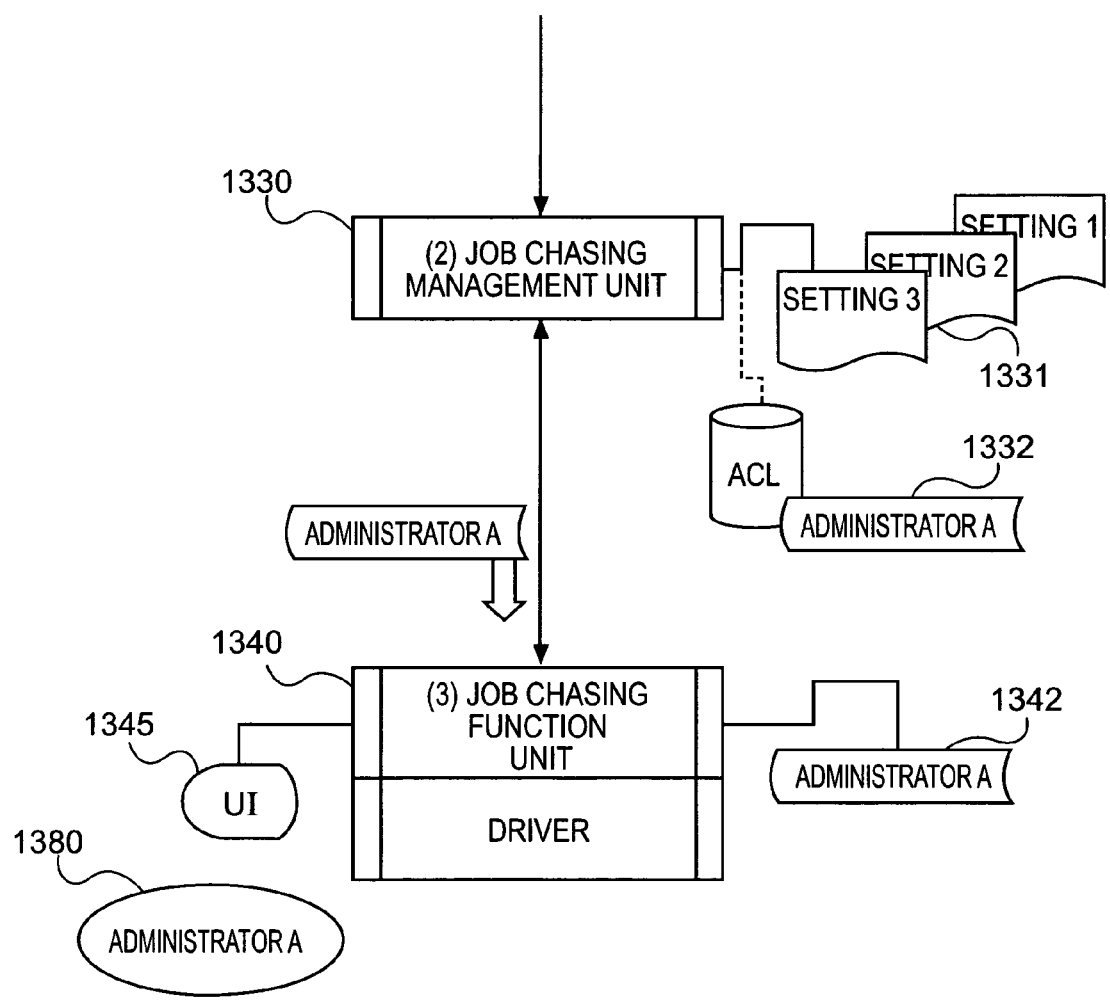
FIG. 15 shows the configuration of a second example of right control according to the embodiment of the present invention.

FIG. 15 shows the configuration of a second example of the right control. In this example, an administrator changes the system setting from the client side by using the authenticating function of this network printing system. The configuration of the upper layer of this network system is the same as that shown in FIG. 13. Therefore, only a different part is shown in FIG. 15.

When an administrator A 1380 wants to change a setting 1331 from the client side, the administrator is authenticated by a job chasing management unit 1330. The job chasing management unit 1330 checks an ACL, and if the administrator A has an access right, the job chasing management unit 1330 provides a certificate 1342 of the administrator A to the client side. When this certificate 1342 is issued, an operating unit (UI) 1345 is displayed, so that the setting 1331 in the job chasing management unit 1330 can be changed.

Figure 16:
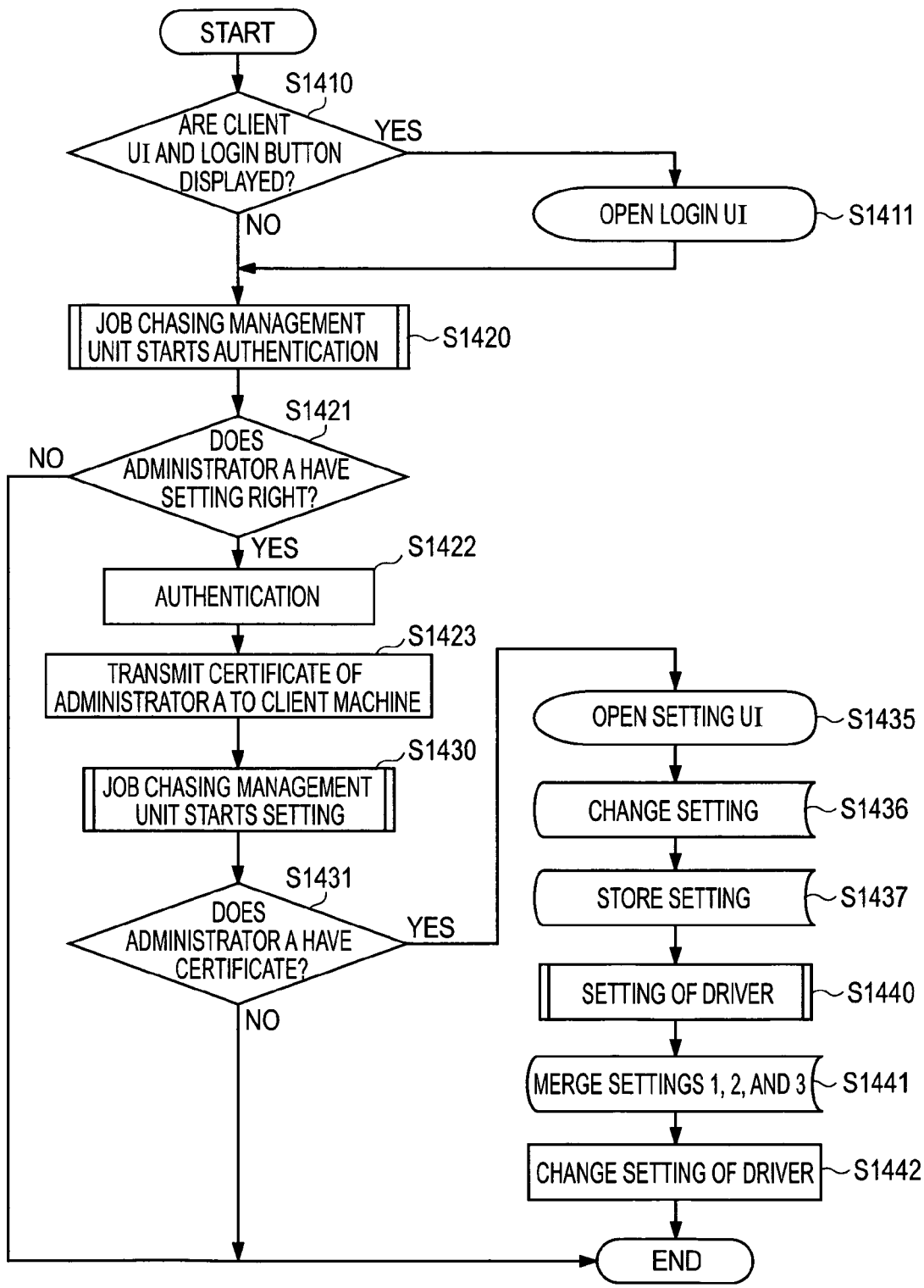
FIG. 16 is a flowchart of the second example of right control according to the embodiment of the present invention.

FIG. 16 is a flowchart of the second example of the right control. When the job chasing management unit 1330 determines that a client UI exists and a login button is displayed therein (step S1410), the job chasing management unit 1330 opens a login UI 1512 shown in FIG. 17 and displays it through the job chasing function unit 1340 of the client (step S1411). On the other hand, when the job chasing management unit 1330 determines in step S1410 that the client UI is set to undisplayed, the process skips to step S1420, and authentication and distribution of the certificate are performed.

The job chasing management unit 1330 starts authentication in step S1420 in accordance with the name of an administrator and a password transmitted from the client. In step S1421, it is determined whether an administrator A corresponding to the user name and password transmitted from the client has a right to set the job chasing management unit 1330. If the administrator A has a setting right, the process proceeds to step S1422 where authentication is performed. Then, in step S1423, a certificate of the administrator A is transmitted from the job chasing management unit 1330 to the client machine.

Then, in step S1430, the job chasing management unit 1330 starts a setting operation. In step S1431, the job chasing management unit 1330 determines whether the administrator A has a certificate. When it is determined that the administrator A has a certificate, the process proceeds to step S1435 where a setting UI is opened. The setting is changed in step S1436 and the changed setting is stored in step S1437. Then, change in setting of the driver starts in step S1440. Setting items required to the driver are merged in step S1441, and the setting 1331 of the driver is changed in step S1442.

FIGS. 17A, 17B, and 17C show examples of a UI used for controlling a right displayed in the UI 1345 shown in FIG. 15. When the client UI exists and the login button is displayed, the job chasing management unit 1330 transmits a command to open a login UI and display the login UI in the UI 1345 on the client side. On a screen 1511 displayed in the UI 1345, the user specifies a name of another server including the job chasing function management unit through the job chasing function unit 1340. Then, the user inputs necessary information for authentication on a screen 1512 and puts an enter button.

Accordingly, the authentication information is transferred to the job chasing management unit. If authentication has been successfully done, a setting UI 1536 can be opened from the client side. The operating specification of the user interface 1536 is the same as that in FIG. 5B. In this UI, the name of a remote server can be specified. When the server determines that a transmitter of a display request is a chasing information management server, the server locally displays the screen shown in FIG. 5B on the chasing information management server side. When the server determines that the transmitter of the display request is a client having a job chasing function unit, the server controls the client apparatus so as to display the screens shown in FIGS. 17A, 17B, and 17C.

After an OK button on the screen 1536 has been pressed, values input through the screen 1536 displayed on the UI 1345 (settings that can be input are the same as those in FIG. 5B) are transferred through the job chasing function unit 1340 to the job chasing management unit 1330.

The job chasing management unit 1330 stores the transferred settings. At this time, if the settings include an already stored setting 1311, the settings are merged. Based on this information, the job chasing management unit 1330 controls the job chasing function unit 1340 so as to chase data generated by the driver, as described above.

As described above, the host computer 3000 includes the printer driver 203 for generating print data, such as PDL data or image data; the job chasing function unit 400 for extracting text data or thumbnail data, serving as history information based on which the content of print data can be identified, from the generated print data; and the job chasing management unit 500 for inputting control information to control the job chasing function unit 400.

The job chasing management unit 500 determines whether a user has a right to input control information (e.g., information to be input from the UI displayed on the screen shown in FIG. 5B or the screen 1536 shown in FIG. 17C) to the job chasing management unit 500 by using identification information associated with the user who provides instructions to control the function of the job chasing function unit. When the job chasing management unit 500 determines that the user has a right to input the control information, the job chasing management unit 500 permits the user to input the control information.

By using the control information, the job chasing management unit 500 controls the job chasing function unit 400.

Alternatively, the control information can include input instructions to switch whether or not the extracting unit extracts the history information.

Also, the control information can include an input of instructing the extracting unit to extract at least one of image data and text data so that the content of the print data can be identified. Further, the control information can include a command to specify at least one of the quality of an image extracted by the job chasing function unit, resolution, and a compression method used to store extracted data.

The job chasing management unit 500 determines whether a user performing an operation has a right to input control information by using a user name obtained through the operating system or the printer driver. Additionally, the control information can include information indicating a place to store history information (e.g., the host name or IP address of the chasing information storage server 1000), or timeout information indicating the time to give up storage of history information after a storage destination does not respond for a predetermined time period. The job chasing function unit 400 can extract text data or thumbnail data with which a user can identify the content to be printed from the PDL data or image data generated by the printer driver. Then, the job chasing function unit 400 can store the extracted data as history information in a memory in the information processing apparatus (a memory ensured by the job chasing function unit 400 in the host computer 3000) or the chasing information storage server 1000 that can be accessed through the host computer and the network.

Now, the chasing data is described in detail. Herein, the chasing data extracted by the job chasing function unit 400 according to the embodiment of the present invention is described. The chasing data is generated in step S702 in FIG. 11. The chasing data is extracted while being classified into the following four categories: (1) information about a printer to output data and its attribute; (2) information about an information apparatus such as a computer that performed printing and its user; (3) various attribute information and statistical information about a print job; and (4) information about respective pages in a print job. Hereinafter, each type of information is described.

Figure 18:
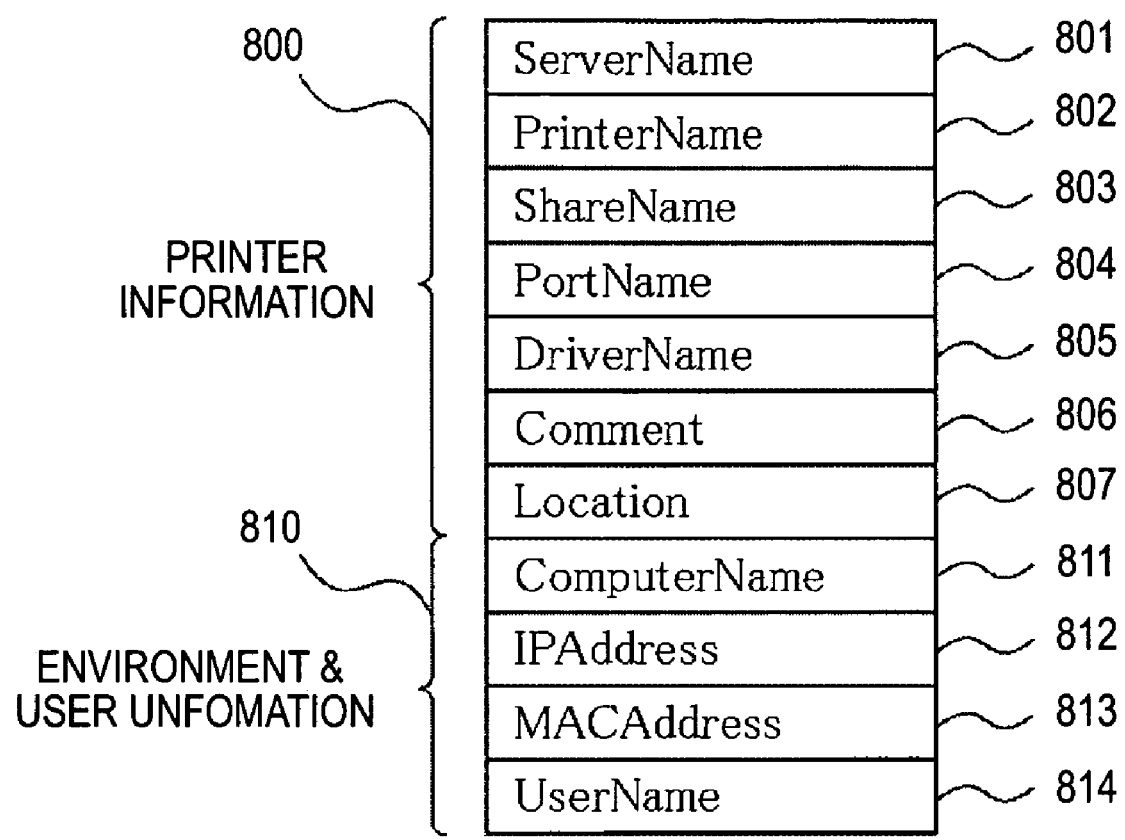
FIG. 18 shows an example of chasing data used in the system shown in FIG. 4.

First, information about a printer to output print data and its attribute is described. FIG. 18 shows an example of information (printer information 800) about a printer to output print data and its attribute. This information depends on a printer to output print data, and thus can be generated at timing of processing a command that occurs at least once in each job in step S702 in FIG. 11, for example, when a job start command is issued.

"ServerName" 801 is used when a printer to output print data performs printing via a print server and indicates the name of the print server.

"PrinterName" 802 indicates a name to specify a target printer in the client PC.

"ShareName" 803 indicates a share name that is set by an administrator so that another client PC can refer to it in the print server. This item is not used when the print server is not used.

"PortName" 804 indicates the name of a port to which the target printer is connected. For example, when an LPR connection is used, a standard name is based on an IP address, and thus a device at an output destination can be specified.

"DriverName" 805 indicates the name of a printer driver used to output data to the target printer. This name is unique to the driver and cannot be changed by a user, unlike the "PrinterName" 802. Therefore, an output target device can be specified.

"Comment" 806 and "Location" 807 are character string information that can be applied from an administrator of a client and a server to the printer driver. When printing is performed through the print server, chasing thereafter can be easily performed if the administrator inputs information for easily specifying a printer in this field.

Next, information about an information apparatus such as a computer that performed printing and about the user is described. The lower part of FIG. 18 shows an example of information about an information apparatus such as a computer that performed printing and about the user (environment and user information 810). This information depends on an environment where printing is performed and the user, and thus can be generated at a command processing timing that occurs at least once during a print job, as the above-described printer information 800.

"ComputerName" 811 indicates the name of a computer that output a print instruction. "IPAddress" 812 indicates a network address included in the computer that output the print instruction. "MACAddress" 813 is an identification symbol unique to a network adaptor included in the computer. Based on these pieces of information, an information apparatus that has output a print instruction can be specified.

"UserName" 814 indicates an identification name of a user who uses the computer that output the print instruction. Based on this information, the user who provided the print instruction is specified.

Figure 19:
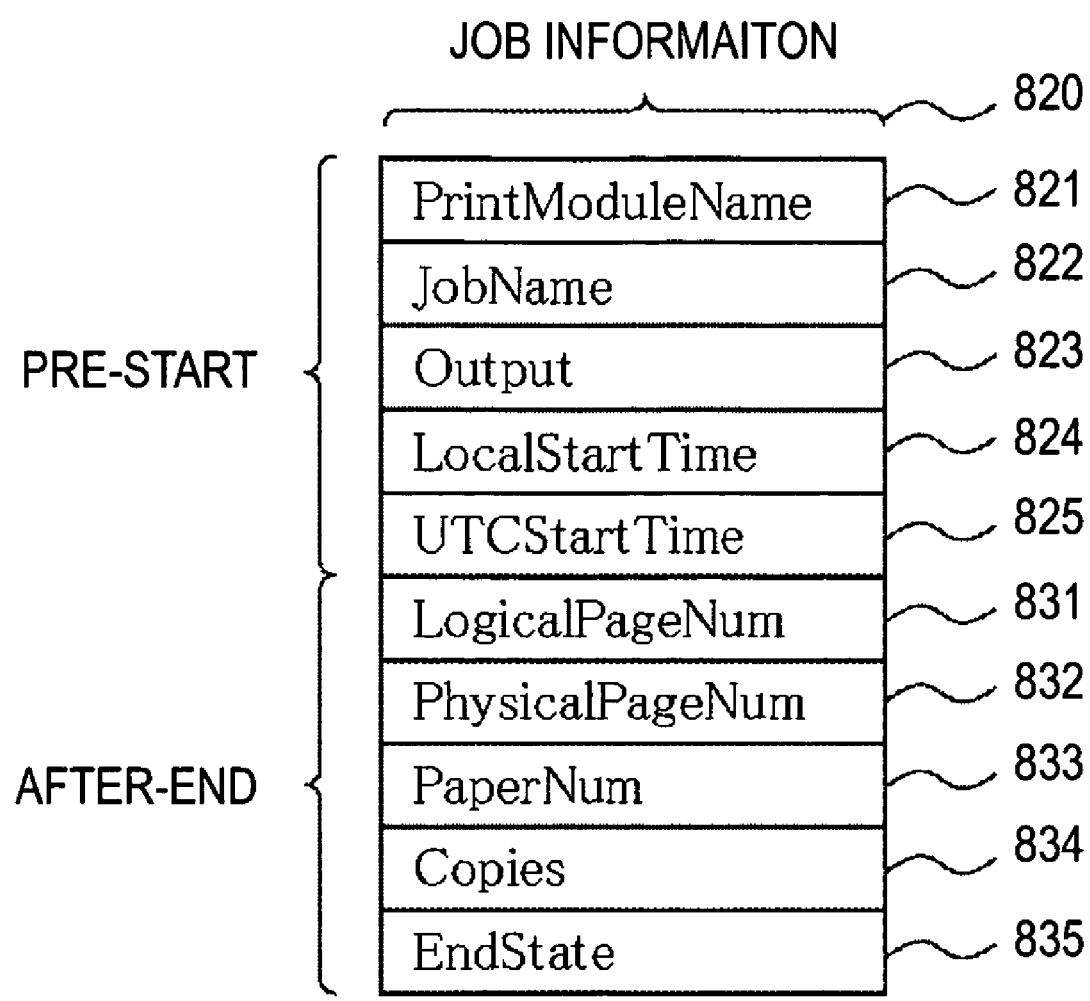
FIG. 19 shows another example of the chasing data used in the system shown in FIG. 4.

Next, various attribute information and statistical information about a print job are described. FIG. 19 shows an example of the various attribute information and statistical information about a print job (job information 820). This information is unique to a print job, and thus can be generated at a command processing timing that occurs at least once during a print job, as the above-described printer information 800 and the environment and user information 810.

"PrintModuleName" 821 indicates the name of a module executing an application executing a printing process. Since the job chasing function unit 400 operates as a part of the printer driver 203, the name of a module executing a printing execution application can be obtained. This information specifies an application in which the printing was performed.

"JobName" 822 indicates the name of a print job that is applied from a printing application to the print job.

"Output" 823 indicates an output destination that is individually specified by the printing application. This information is not used when the printing application does not specify an output destination of a job.

"LocalStartTime" 824 and "UTCStartTime" 825 indicate date and time when printing starts. "LocalStartTime" 824 indicates date and time in a local computer, whereas "UTCStartTime" 825 indicates the start time represented by a coordinated universal time incorporating a locale set on the local computer. By indicating the date and time in two ways, the date and time of printing can be uniformly obtained regardless of the locale set in the target computer.

The above-described pieces of information 821 to 825 are fixed at start of printing, and thus can be processed when a print starting command is executed.

"LogicalPageNum" 831 indicates the number of logical pages. The logical page means each page that is laid out in one physical page when an N-inOne printing is performed. This information can be obtained by counting the number of switching commands or switching controls of logical pages during a job.

"PhysicalPageNum" 832 indicates the number of physical pages. The physical page means, for example, each side of sheet of paper in duplex printing. This information can be obtained by counting the number of page end commands during a job.

"PaperNum" 833 indicates the number of physical sheets of paper used in printing. By monitoring the count of the "PhysicalPageNum" 832 and transition between duplex and one-sided printing modes during a print job, the number of physical sheets to be output can be obtained.

"Copies" 834 indicates the number of copies to be printed specified in a print job and can be obtained by monitoring a number of copies specifying command included in the print job. When the driver 203 replays each page to support printing of multiple copies in order to reduce the size of chasing data, only part of data can be extracted.

"EndState" 835 indicates a job end state. This information indicates that the job was normally ended or a user requested a pause of printing. When the user requested a pause of printing, the number of pages generated by the driver 203 does not necessarily match the number of pages that were actually output. Therefore, when the "EndState" 835 indicates a pause, that indicates a possibility that the above-described phenomenon occurred.

The above-described pieces of information 831 to 835 include statistical information that is fixed when a print job ends, and thus are processed when a print job end command is issued.

Figure 20:
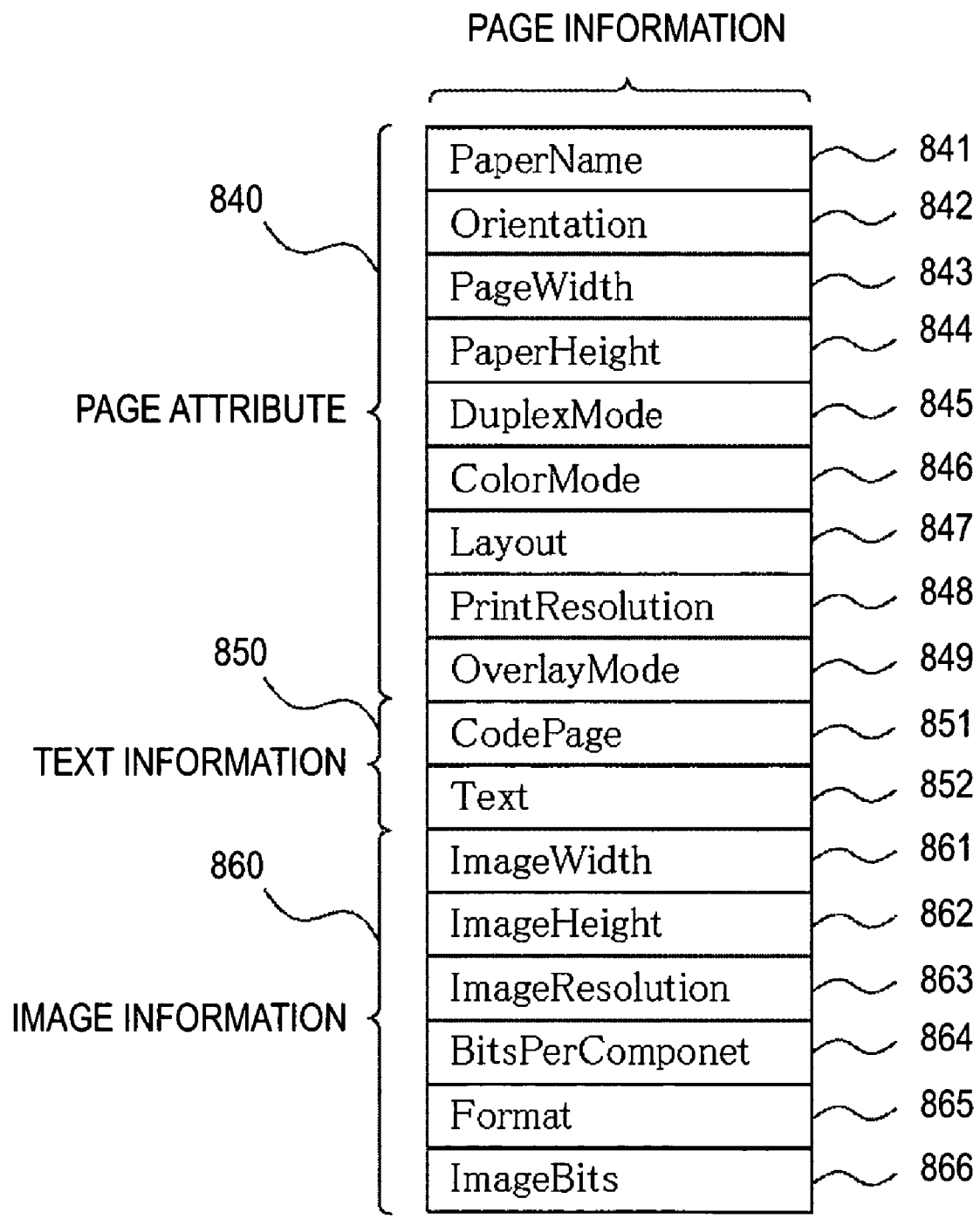
FIG. 20 shows another example of the chasing data used in the system shown in FIG. 4.

Next, information about the content of each page in a print job is described. FIG. 20 shows an example of information (page information) about the content of each page in a print job. In this example, the page information is roughly classified into page attribute information 840, text information 850, and image information 860. The page attribute information 840 is information describing attributes of a target page, the text information 850 is text information included in the page, and the image information 860 is extracted page image information. Hereinafter, each of them is described.

"PageName" 841 is information indicating the name of paper of a target page. "Orientation" 842 indicates the orientation of the page, that is, either portrait or landscape.

"PageWidth" 843 and "PageHeight" 844 indicate the size of paper.

"DuplexMode" 845 indicates whether the page is printed in a duplex mode or a one-sided mode.

"ColorMode" 846 indicates whether the page is printed in a color mode or a monochrome mode. "Layout" 847 indicates the layout mode of the page, such as Nup printing or poster printing.

"PrintResolution" 848 indicates the printing resolution of the page.

"OverlayMode" 849 indicates an overlay operation mode, such as a normal printing mode, an overlay printing mode, or an overlay registration mode. In the overlay printing mode, a target job added with an overlay is actually printed. In the registration mode, printing is not performed only by the target job. This information is collected to indicate these conditions.

"CodePage" 851 indicates code page information of character code described in "Text" 852. The code page information is used to, for example, convert a unicode of two bytes to a double byte character set (DBCS).

"Text" 852 stores character code information supplied by a text rendering command included in the page. The "Text" 852 is extracted every time a text rendering command is issued.

The text information 850 is chasing information that is extracted when the check box 524 "Extract text" shown in FIG. 5B is checked.

"ImageWidth" 861 and "ImageHeight" 862 indicate the size of an extracted page image by the number of pixels.

"ImageResolution" 863 indicates the resolution of an extracted page image and corresponds to the value indicated in the resolution 528 shown in FIG. 5B.

"BitsPerComponent" 864 indicates the gradation of an extracted page image and corresponds to the value specified in "the number of bits (color)" 526 and "the number of bits (monochrome)" 527 shown in FIG. 5B.

"Format" 865 indicates the format of an extracted page image.

"ImageBits" 866 indicates the substance of an actually extracted page image, and is generated by writing a rendering image into a bitmap area of the page image every time a rendering command is processed.

The pieces of information 861 to 866 relating to an extracted page image are extracted when the check box 525 "Extract image" shown in FIG. 5B is checked.

The display format of the above-described information that is extracted or generated as chasing data can be described in an extensible markup language (XML).

Examples of the chasing data have been cited in the above-described embodiment.

The chasing data (including image thumbnails and text data extracted from data generated in accordance with a printing process) can be obtained by the job chasing function processing unit 402 through the despooler 305 shown in FIG. 4, and the chasing data can be transferred to the chasing information storage server 1000 through the job chasing management unit 500 and the network, so that an administrator or a specific user can browse the chasing information from another client (not shown) through a viewer or a browser.

The present invention can be applied to a system composed of a plurality of apparatuses (e.g., a computer, an interface apparatus, a reader, and a printer) or a single apparatus (e.g., a copying machine, a printer, or a facsimile). The present invention can be carried out when a computer (or CPU or MPU) of the system or apparatus reads and executes program code that realizes the procedure of the flowchart described in the above-described embodiment and that is stored in the storage medium.

In this case, the program code read from the storage medium realizes the functions of the above-described embodiment. Therefore, the storage medium storing the program code is included in the present invention.

Examples of the storage medium to supply the program code include a floppy disk, a hard disk, an optical disk, a magneto-optical disk, a compact disk read only memory (CD-ROM), a compact disk recordable (CD-R), a magnetic tape, a nonvolatile memory card, and a read only memory (ROM).

The functions of the above-described embodiment are realized when the computer reads and executes the program code. Alternatively, the functions of the above-described embodiment can be realized when an operating system (OS) operating in the computer executes part or all of actual processing in accordance with the instructions of the program code.

Further, after the program code read from the storage medium has been written into a memory of a function expanding board inserted to the computer or a function expanding unit connected to the computer, a CPU or the like provided in the function expanding board or the function expanding unit can execute part or all of actual processing in accordance with the instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims the benefit of Japanese Application No. 2004-338928 filed Nov. 24, 2004, which is hereby incorporated by reference herein in its entirety.

What is claimed is:

1. A printing system, comprising:
   an information processing apparatus; and
   a chasing management apparatus, wherein the information processing apparatus and the chasing management apparatus are connected via a communication medium,
   wherein the chasing management apparatus comprises:
      a chasing data setting unit that sets setting information for generating chasing data generated by the information processing apparatus, the setting information including extraction information to instruct extracting at least one of image data and text data which is able to identify content of print data, and
   wherein the information processing apparatus comprises:
      a print data generating unit that generates print data for a printing device; and
      a chasing data generating unit that generates the chasing data for a chasing information management server, wherein the chasing data generating unit generates the chasing data based on the extraction information set by a manager.

2. The printing system according to claim 1, wherein
   the extraction information includes at least one of whether or not to extract the text data and whether or not to extract the image data, and
   the extraction information further includes at least one of the number of bits of the image to be extracted, resolution, and a compressing method when the image data is extracted.

3. The printing system according to claim 1, wherein
   the print data generating unit and the chasing data generating unit operate by using a printer driver, and
   the chasing data generating unit extracts image or text data which is able to identify the content of the print data from a page description language or image data generated by the printer driver, and stores the extracted image or text data as chasing information to the chasing information management server which is able to communicate with a memory in the information processing apparatus or the information processing apparatus via a communication medium.

4. An information processing apparatus equipped with a printer driver generating print data, the information processing apparatus comprising:
   a print data generating unit that generates print data;

a chasing data generating unit that generates chasing data;
a print data transmission unit that transmits the print data generated by the print data generating unit to a printing device; and
a chasing data transmission unit that transmits the chasing data generated by the chasing data generating unit to a chasing information management server,
wherein the chasing data generating unit generates the chasing data based on extraction information set by a manager,
the chasing data transmission unit sets the chasing information management server based on the extraction information set by the manager, and
the extraction information includes at least one of whether or not to extract the text data and whether or not to extract the image data.

5. The information processing apparatus according to claim 4, wherein the extraction information further includes at least one of the number of bits of the image to be extracted, resolution, and a compressing method when the image data is extracted.

6. The information processing apparatus according to claim 4, wherein
the print data generating unit and the chasing data generating unit operate by using the printer driver, and
the chasing data generating unit extracts image or text data which is able to identify the content of the print data from a page description language or image data generated by the printer driver, and stores the extracted image or text data as chasing information to the chasing information management server to which a memory in the information processing apparatus or the chasing data transmission unit transmit.

7. A printing method for use in a printing system having an information processing apparatus and a chasing management apparatus, wherein the information processing apparatus and the chasing management apparatus are connected via a communication medium, the printing method comprising:
setting setting information for generating chasing data generated by the information processing apparatus, the setting information including extraction information to instruct extracting at least one of image data and text data which is able to identify content of print data, wherein the chasing management apparatus sets the setting information;
generating print data for a printing device, wherein the information processing apparatus generates the print data; and
generating the chasing data for a chasing information management server, wherein the generating the chasing data comprises generating the chasing data based on the extraction information set by a manager, wherein the information processing apparatus generates the chasing data.

8. The printing method according to claim 7, wherein
the extraction information includes at least one of whether or not to extract the text data and whether or not to extract the image data, and
the extraction information further includes at least one of the number of bits of the image to be extracted, resolution, and a compressing method when the image data is extracted.

9. The printing method according to claim 7, wherein
the print data and the chasing data are generated by using a printer driver, and
the generating the chasing data comprises extracting image or text data which is able to identify the content of the print data from a page description language or image data generated by the printer driver, and storing the extracted image or text data as chasing information to the chasing information management server which is able to communicate with a memory in the information processing apparatus or the information processing apparatus via a communication medium.

10. A computer-readable storage medium storing computer-executable instructions for causing a computer to execute the method of claim 7.

11. An information processing method for use with an information processing apparatus equipped with a printer driver, the information processing method comprising:
generating print data;
generating chasing data;
transmitting the print data to a printing device; and
transmitting the chasing data to a chasing information management server,
wherein the generating the chasing data comprises generating the chasing data based on extraction information set by a manager,
the transmitting the chasing data comprises setting the chasing information management server based on the extraction information set by the manager, and
the extraction information includes at least one of whether or not to extract the text data and whether or not to extract the image data.

12. The information processing method according to claim 11, wherein the extraction information further includes at least one of the number of bits of the image to be extracted, resolution, and a compressing method when the image data is extracted.

13. The information processing method according to claim 11, wherein
the print data and the chasing data are generated by using the printer driver, and
the generating the chasing data comprises extracting image or text data which is able to identify the content of the print data from a page description language or image data generated by the printer driver, and storing the extracted image or text data as chasing information to the chasing information management server to which a memory in the information processing apparatus or the information processing apparatus transmits.

14. A computer-readable storage medium storing computer-executable instructions for causing a computer to execute the method of claim 11.

* * * * *